(12) United States Patent  
Cites et al.

(10) Patent No.: US 9,339,993 B2  
(45) Date of Patent: May 17, 2016

(54) APPLIANCE FASCIA AND MOUNTING THEREFORE

(75) Inventors: Jeffrey Scott Cites, Horseheads, NY (US); Steven S. Rosenblum, Ithaca, NY (US); George Francis Wildeman, Corning, NY (US)

(73) Assignee: Corning Incorporated, Corning, NY (US)

(*) Notice: Subject to any disclaimer, the term of this patent is extended or adjusted under 35 U.S.C. 154(b) by 0 days.

(21) Appl. No.: 13/822,132

(22) PCT Filed: Sep. 13, 2011

(86) PCT No.: PCT/US2011/051355  
§ 371 (c)(1),  
(2), (4) Date: Mar. 11, 2013

(87) PCT Pub. No.: WO2012/037094  
PCT Pub. Date: Mar. 22, 2012

(65) Prior Publication Data  
US 2013/0164483 A1 Jun. 27, 2013

Related U.S. Application Data

(60) Provisional application No. 61/382,714, filed on Sep. 14, 2010, provisional application No. 61/418,103, filed on Nov. 30, 2010.

(51) Int. Cl.  
B32B 17/00 (2006.01)  
B32B 3/00 (2006.01)  
(Continued)

(52) U.S. Cl.  
CPC . B32B 17/00 (2013.01); B32B 3/00 (2013.01); B32B 3/04 (2013.01);  
(Continued)

(58) Field of Classification Search  
CPC .............. F25D 23/02; F25D 2400/361; A47L 15/4265; C03C 21/002; B32B 17/00; B32B 17/061; B32B 17/064; B32B 17/067; B32B 17/10137; B32B 3/00; B32B 3/04; B32B 17/06; B32B 17/10018; B32B 17/10293; Y10T 428/2419  
USPC ........................................ 428/68, 77, 174, 78  
See application file for complete search history.

(56) References Cited

U.S. PATENT DOCUMENTS 3,819,906 A 6/1974 Gould, Jr. ..................... 219/506  
4,465,734 A * 8/1984 Laroche et al. ............ 428/317.1  
(Continued)

FOREIGN PATENT DOCUMENTS

CN 2709891 Y 7/2005 .............. F25D 23/02  
CN 2823932 Y 10/2006  
(Continued)

*Primary Examiner* — Aaron Austin  
*Assistant Examiner* — Jasper Saberi  
(74) *Attorney, Agent, or Firm* — Ryan T. Hardee

(57) ABSTRACT

A thin lightweight glass fascia for appliances. The fascia may be a seamless shaped glass fascia for an appliance, such as a glass fascia that wraps around at least two opposing edges of an appliance. The glass fascia may seamlessly incorporate a display or control panel under the fascia. A mounting arrangement that facilitates quick fascia removal and replacement may be provided. The fascia may be a chemically-strengthened glass sheet having a thickness of less than 2.0 mm, and a near-surface region under a compressive stress, wherein the compressive stress (CS) at a surface of the first glass sheet is greater than 300 MPa and extends to a depth of layer of at least 20 micrometers.

34 Claims, 11 Drawing Sheets

(51) Int. Cl.
*B32B 3/04* (2006.01)
*B32B 17/10* (2006.01)
*C03C 21/00* (2006.01)
*F25D 23/02* (2006.01)

(52) U.S. Cl.
CPC .... *B32B 17/10036* (2013.01); *B32B 17/10137* (2013.01); *B32B 17/10293* (2013.01); *C03C 21/00* (2013.01); *F25D 23/02* (2013.01); *Y10T 428/23* (2015.01); *Y10T 428/24628* (2015.01); *Y10T 428/266* (2015.01)

(56) References Cited

U.S. PATENT DOCUMENTS

| | | | |
|---|---|---|---|
| 4,483,700 A | 11/1984 | Forker, Jr. et al. | 65/30.14 |
| 4,913,529 A | 4/1990 | Goldenberg et al. | 350/337 |
| 5,002,368 A | 3/1991 | Anglin | 350/334 |
| 5,589,248 A * | 12/1996 | Tomozane et al. | 428/174 |
| 5,674,790 A | 10/1997 | Araujo | 501/66 |
| 5,694,778 A | 12/1997 | Wilson | 62/77 |
| 5,909,937 A | 6/1999 | Jenkins et al. | 312/405.1 |
| 5,997,924 A | 12/1999 | Olander, Jr. et al. | 426/296 |
| 6,138,432 A | 10/2000 | Banicevic | 52/784.15 |
| 6,302,472 B1 | 10/2001 | Rahmstorf et al. | 219/146.5 |
| 6,352,754 B1 * | 3/2002 | Frost et al. | 428/77 |
| 6,359,270 B1 | 3/2002 | Bridson | 219/679 |
| 6,486,453 B1 | 11/2002 | Bales et al. | 219/702 |
| D467,597 S | 12/2002 | Min et al. | D15/85 |
| 6,505,442 B2 | 1/2003 | Banicevic et al. | 49/501 |
| 6,679,006 B2 | 1/2004 | Banicevic et al. | 49/501 |
| 6,774,971 B2 | 8/2004 | Shirato et al. | 349/150 |
| 6,779,859 B2 | 8/2004 | Koons | 312/405 |
| 6,934,592 B2 | 8/2005 | Hood et al. | 700/83 |
| D522,541 S | 6/2006 | Kim et al. | D15/86 |
| D523,033 S | 6/2006 | Kim et al. | D15/86 |
| 7,055,920 B2 | 6/2006 | Leistner et al. | 312/406.2 |
| D524,331 S | 7/2006 | Kim et al. | D15/85 |
| 7,140,159 B2 | 11/2006 | Avendano et al. | 52/784.1 |
| D533,884 S | 12/2006 | Kim et al. | D15/85 |
| 7,334,853 B2 | 2/2008 | Ahmed et al. | 312/405.1 |
| 7,340,915 B2 | 3/2008 | Kwon | 62/398 |
| 7,563,511 B2 | 7/2009 | Koo | 428/428 |
| 7,665,810 B2 | 2/2010 | Crompton et al. | 312/204 |
| 7,666,511 B2 | 2/2010 | Ellison et al. | |
| 7,766,436 B1 | 8/2010 | Steinkuhl et al. | 312/296 |
| 2001/0039805 A1 | 11/2001 | Tavolazzi | 62/125 |
| 2001/0049327 A1 | 12/2001 | Hachitani | |
| 2002/0003531 A1 | 1/2002 | Kim et al. | 345/173 |
| 2002/0038553 A1 | 4/2002 | Yun et al. | 62/126 |
| 2002/0066258 A1 | 6/2002 | Oishi et al. | 52/784.15 |
| 2002/0152045 A1 | 10/2002 | Dowling et al. | 702/107 |
| 2002/0190617 A1 | 12/2002 | Banicevic et al. | 312/321.5 |
| 2003/0150853 A1 | 8/2003 | Kang | 219/720 |
| 2003/0173883 A1 | 9/2003 | Koons | 312/405 |
| 2003/0234250 A1 | 12/2003 | Lee | 219/720 |
| 2004/0005469 A1 | 1/2004 | Metz et al. | 428/446 |
| 2004/0040956 A1 | 3/2004 | Chun | 219/720 |
| 2004/0117274 A1 | 6/2004 | Cenedese et al. | 705/28 |
| 2004/0177591 A1 | 9/2004 | Avendano et al. | 52/784.1 |
| 2004/0183413 A1 | 9/2004 | Koo | 312/401 |
| 2004/0183414 A1 | 9/2004 | Kwon | 312/405 |
| 2004/0211210 A1 | 10/2004 | Crisp, III | 62/389 |
| 2004/0216471 A1 | 11/2004 | Kim et al. | 62/126 |
| 2005/0040747 A1 | 2/2005 | Leistner et al. | 312/401 |
| 2005/0184153 A1 | 8/2005 | Auchinleck | 235/385 |
| 2006/0131253 A1 | 6/2006 | Richardson et al. | 211/189 |
| 2006/0144056 A1 | 7/2006 | Oh | 62/126 |
| 2006/0225580 A1 | 10/2006 | Fernandez et al. | 99/419 |
| 2006/0273699 A1 | 12/2006 | Bauer | 312/109 |
| 2007/0012307 A1 | 1/2007 | Wiker et al. | 126/21 A |
| 2007/0143456 A1 | 6/2007 | Mashinsky | 709/223 |
| 2007/0188059 A1 * | 8/2007 | Davis et al. | 312/265.6 |
| 2008/0231159 A1 * | 9/2008 | Lee et al. | 312/405 |
| 2008/0273016 A1 | 11/2008 | Helgesen | 345/173 |
| 2008/0276976 A1 | 11/2008 | Buller et al. | 134/56 |
| 2008/0297019 A1 | 12/2008 | Kim | 312/405 |
| 2008/0302030 A1 * | 12/2008 | Stancel | H01L 31/02008 52/173.3 |
| 2008/0314626 A1 | 12/2008 | Moore | 174/255 |
| 2009/0011803 A1 | 1/2009 | Weber et al. | 455/575.1 |
| 2009/0153494 A1 | 6/2009 | Laundroche et al. | |
| 2009/0197088 A1 | 8/2009 | Murata | |
| 2009/0202808 A1 * | 8/2009 | Glaesemann et al. | 428/220 |
| 2009/0249824 A1 * | 10/2009 | Koo | F25D 23/028 62/449 |
| 2009/0284372 A1 | 11/2009 | Nelson et al. | 340/539.14 |
| 2009/0302723 A1 | 12/2009 | Laible et al. | 312/237 |
| 2009/0306827 A1 | 12/2009 | Kim et al. | 700/275 |
| 2010/0000259 A1 | 1/2010 | Ukrainczyk et al. | |
| 2010/0035038 A1 | 2/2010 | Barefoot et al. | 428/220 |
| 2010/0045617 A1 | 2/2010 | Lee | 345/173 |
| 2010/0047521 A1 | 2/2010 | Amin et al. | 428/141 |
| 2010/0129602 A1 | 5/2010 | Dejneka | 428/130 |
| 2010/0137953 A1 | 6/2010 | Stein | 607/112 |
| 2010/0139720 A1 | 6/2010 | Beaudet et al. | 134/57 D |
| 2010/0139721 A1 | 6/2010 | Beaudet et al. | 134/57 D |
| 2010/0139722 A1 | 6/2010 | Koch et al. | 134/57 D |
| 2010/0141104 A1 | 6/2010 | Beaudet et al. | 312/228 |
| 2010/0145483 A1 | 6/2010 | McGonagle et al. | 700/83 |
| 2010/0147823 A1 | 6/2010 | Anderson et al. | 219/391 |
| 2010/0170289 A1 | 7/2010 | Graziano | 62/449 |
| 2010/0181308 A1 | 7/2010 | Lee | 219/720 |

FOREIGN PATENT DOCUMENTS

| | | | |
|---|---|---|---|
| CN | 101809392 | 8/2010 | F25D 23/02 |
| CN | 101809393 | 8/2010 | F25D 23/02 |
| CN | 101809394 | 8/2010 | F25D 23/06 |
| DE | 19743752 A1 | 4/1999 | G07F 11/58 |
| DE | 20320945 U1 | 7/2005 | F24C 7/08 |
| DE | 102008043722 A1 | 5/2010 | F24C 15/02 |
| EP | 432872 A2 | 6/1991 | F25D 23/02 |
| EP | 503893 A1 | 9/1992 | A47F 3/04 |
| EP | 541109 | 2/1998 | F25D 23/02 |
| EP | 1555497 A1 | 7/2005 | F25D 23/02 |
| FR | 2869635 A1 | 11/2005 | |
| FR | 2880411 A1 | 7/2006 | H05B 6/64 |
| GB | 1404778 A | 9/1975 | A47B 37/00 |
| GB | 2399161 A | 6/2004 | F25D 29/00 |
| GB | 2401424 A | 11/2004 | F25D 23/02 |
| GB | 2455513 A | 6/2009 | G02B 5/00 |
| JP | S54-1979-028319 A | 3/1979 | |
| WO | WO9208285 A1 | 5/1992 | H03K 17/94 |
| WO | WO9828657 A1 | 7/1998 | G02F 1/13 |
| WO | WO0170087 A2 | 9/2001 | A47J 37/06 |
| WO | WO2004015343 A1 | 2/2004 | F25D 23/02 |
| WO | WO2006112633 A1 | 10/2006 | F25D 23/02 |
| WO | 2007011178 A1 | 1/2007 | |
| WO | WO2007/054261 A1 | 5/2007 | G06F 3/033 |
| WO | WO2008044834 A2 | 4/2008 | B44C 1/22 |
| WO | WO2008075940 A1 | 6/2008 | B44C 1/22 |
| WO | WO2008148258 A1 | 12/2008 | F24C 7/02 |
| WO | WO2009017376 A2 | 2/2009 | C23C 14/00 |
| WO | WO2009035281 A2 | 3/2009 | F25D 29/00 |
| WO | WO2009043601 A1 | 4/2009 | F25D 23/02 |
| WO | WO 2009043603 A1 * | 4/2009 | |
| WO | WO2009097340 A2 | 8/2009 | F27D 11/02 |
| WO | WO2010029077 A1 | 3/2010 | F25D 23/02 |

* cited by examiner

APPLIANCE FASCIA AND MOUNTING THEREFORE

CLAIMING BENEFIT OF PRIOR FILED U.S. APPLICATION

This application claims the benefit of priority under 35 U.S.C. §365 of International patent application Ser. No. PCT/US11/51355 filed on Sep. 13, 2011 designating the United States of America, which in turn claims priority to 35 U.S.C. §119 of U.S. Provisional Application Ser. No. 61/382,714 filed on Sep. 14, 2010, and U.S. Provisional Application Ser. No. 61/418,103 filed on Nov. 30, 2010. The content of these documents and the entire disclosure of publications, patents, and patent documents mentioned herein are incorporated by reference.

BACKGROUND

The disclosure relates to a glass article used as the front cover or fascia of a device, such as an appliance; a seamless shaped glass fascia for an appliance, such as a glass fascia that wraps around at least two opposing edges of an appliance; a glass fascia that seamlessly incorporates a display or control panel; a thin lightweight glass fascia for appliances; and mounting arrangements for such fascias, including a mounting arrangement that facilitate quick fascia removal and replacement.

Numerous appliances, furniture, and electronic devices have used shaped covers to create unique and appealing designs. Handheld electronic devices in particular have employed seamless full front covers or fascias. Several problems stand out in attempting to apply the seamless cover or fascia designs commonly used in handheld devices to larger devices such as appliances. First, smaller product volumes. A handheld device may easily sell in millions of units, whereas a high volume "white good" may only sell in the hundreds of thousands of units. Thus, appliance manufacturers need a more cost-effective way to update models with new unique and appealing design elements, while relying on a common underlying platform. Second, quality of build. Consumers are beginning to expect relatively high mechanical tolerances in appliances. This creates a need for small gaps between device components in order to provide an appearance of a tight fit and a solid "feel", which requires precision forming and alignment of components. Third, an ability to redecorate or change the fashion a device in order to provide a customized look is desirable. For example, when redecorating or remodeling a kitchen, it may be desirable to change the color or appearance of the kitchen appliances.

Flat glass has been increasingly used as decorative front panels for household appliances, such as decorative flat glass refrigerator front door panels. Glass panels provide an appealing glossy decorative look with an appearance of depth. Compared with plastic and stainless steel, glass has a number of other superior mechanical properties. Glass has a harder surface hardness than plastic and metal, such as stainless steel. Glass therefore has a higher scratch resistance than plastic and stainless steel. Glass also does not deform plastically as plastic and metal do. Glass therefore does not dent and leave a permanent plastic deformation scars and dents on its surface as stainless steel and plastic do. These properties make a glass fascia much more durable than plastic or even a metal fascias, thereby providing glass based appliance fascias a significant advantage over metal and plastic fascias in maintaining their appearance over a long service life.

To date, glass appliance fascias have been largely limited to flat, planar fascias. Typical techniques for forming complex shapes with glass, such as dropping a gob of molten or softened glass into a hot pressing apparatus, do not yield sufficient dimensional control to produce aesthetically pleasing designs capable of mass production. As a result, current state of the art designs for front covers or fascias for appliances having ornamental 3-D or shaped designs are typically limited to easily formed plastic or metal materials that can readily be formed into 3-D shapes through bending, extruding, molding, or the like.

FIG. 1 shows a representative Prior Art mounting technique for mounting an edge to edge decorative flat glass fascia 10 on an appliance. Edge-to-Edge glass designs have typically employed one or more of (1) a bezel, frame or rails 12 along the edges of the glass sheet/fascia, (2) bonding surfaces on which to affix the glass, or (3) floating designs which expose the underlying support mechanism or obscure the support structure with non-glass materials for supporting and mounting the glass fascia on the appliance. Moreover, soda lime glass is widely used for appliance fascias. To pass a variety of tests required in safety standards, especially mechanical impact tests, the sheet of soda lime glass is usually tempered and of 3.2 mm or more in thickness. Use of such thick sheets of glass makes this kind of glass fascia excessively heavy and makes it difficult to appealingly or smoothly integrate the glass panel into the appliances. Such a relatively thick full front soda lime glass fascia can add up to 25 lbs to the weight of an appliance, which makes it field-replacement and customer handling difficult.

There is a need in the art for a seamless glass cover/fascia for devices, such as appliances, that may be shaped into unique configurations or seamlessly incorporate a display or control panel. There is also a need in the art for thin light weight glass fascias for appliances and for mounting structures for mounting a thin glass fascia to an appliance or other device in a manner that inhibits fracturing of the thin glass fascia upon impact or loading.

Appliance manufacturers seek ways to replicate the design elements used in handheld devices and have begun to include touch screen displays control panes into their products (i.e. LCD+touch sensing system+software). However, the application requirements have typically put the touch screens either on the top surface of the appliance or behind plastic or relatively thick glass and an air gap, which often results in unsatisfactory appearance and performance. When a touch control panel is placed in the top or front surface of an appliance, then the appliance no longer has a seamless design. Whereas, when the touch control panes is placed behind plastic or thick glass with an air gap, then appearance of the control panel/display is aesthetically unpleasing due to the "tunnel effect" caused by the distance between the top surface and the display. Further, a plastic cover on the control panel is prone to scratching and may provide a cheap feel.

There is a need in the art for a thin lightweight, scratch resistant glass for use a decorative fascia—for appliances. There is also a need for the effective and economical seamless incorporation of a display or touch control panel into a glass fascia in a device such as an appliance.

SUMMARY

An embodiment hereof of this disclosure relates to a bent glass article used as the front cover or decorative fascia of a device. Specifically, the glass article may have a substantially flat front or top surface. The side edges may be bent back or down around the edges of the device in order to provide a clean looking seamless design According to one aspect of the disclosure, a glass fascia comprises a chemically-strengthened glass sheet. The glass sheet may have a thickness of less than 2.0 mm, and a near-surface region under a state of compressive stress. The compressive stress at a surface of the glass sheet can be greater than 300 MPa, and the near surface region extends from a surface of the glass sheet to a depth of layer which, expressed in micrometers, is greater than 65-0.06 (CS), where CS is the compressive stress at a surface of the glass sheet in MPa. The near surface region of both major surface of the glass fascia, e.g. the front and rear surface or top and bottom surface, may be under compressive stress, such as Corning® Gorilla™ glass. Such a glass fascia has a harder more scratch resistant surface, which provides a compelling advantage over conventional soda lime glass fascias due to its scratch resistance. Such a glass fascia is also relatively thin, which provides an advantage over conventional soda lime glass fascias due to its light weight.

Another aspect of the present disclosure relates to a curved glass fascia for use in appliances, furniture, architecture and electronic devices. Potential applications include, but are not limited to, refrigerators, ovens, dishwashers, cabinets, tables, countertops, wall coverings, and elevator control panels.

Embodiments disclosed herein include glass article or fascias and a design for a glass article or fascia, as well as devices such as appliance or other device that includes a glass article or fascia.

Another embodiment hereof includes a sheet of relatively thin chemically strengthened glass bonded to a touch screen display panel. The distance between the LCD and a top or front of the display panel and the inner surface of the glass may be <5 mm. The display may be located on the exterior of the appliance's structural members, eliminating the need to cut out an opening to accommodate the display. The display may connect to the appliance through a standard connector that provides the required DC operating voltage and communication signals between the display and the appliance controller.

It is to be understood that both the foregoing general description and the following detailed description of exemplary embodiments of the invention are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention and together with the description serve to explain the principles and operations of the invention.

DETAILED DESCRIPTION

Figure 1:
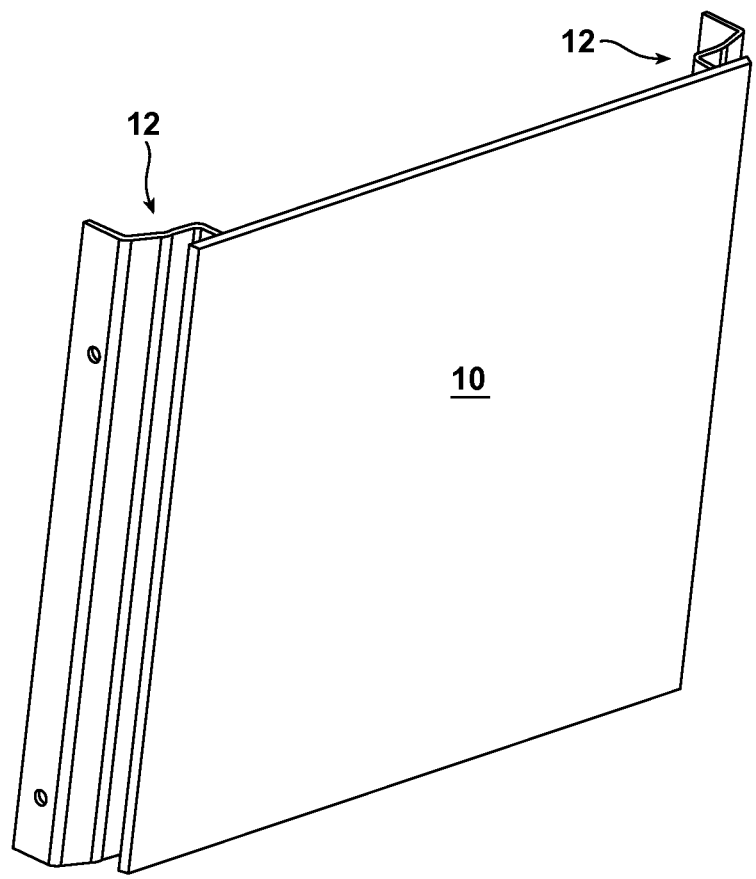
FIG. 1 is a schematic view of a Prior Art mounting for a relatively thick planar glass fascias for an appliance.

Reference will now be made in detail, by way of example only, to various embodiment(s) hereof as illustrated in the accompanying drawings. Whenever possible, the same reference numerals will be used throughout the drawings to refer to the same or like parts.

Figure 2:
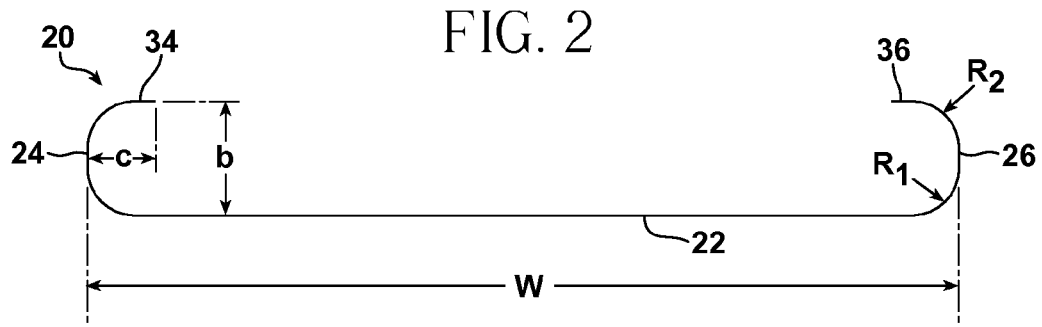
FIG. 2 is a schematic top view of design parameters for a shaped glass fascia according to various embodiments hereof.
Figure 3:
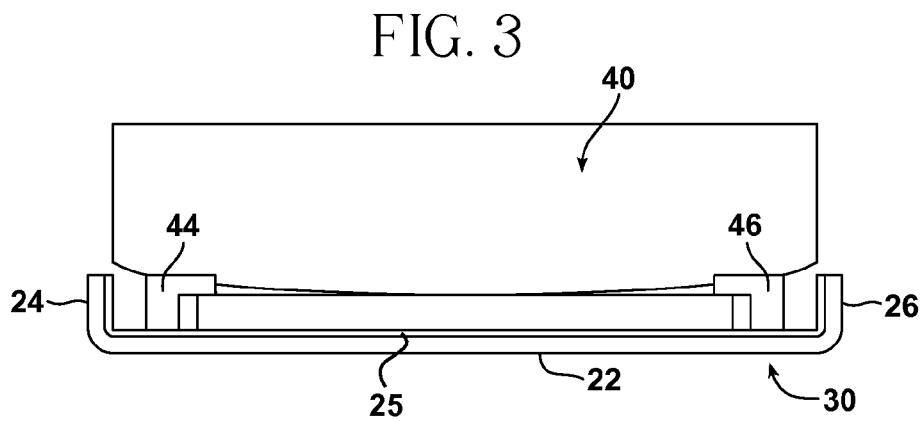
FIG. 3 is a schematic top view of a shaped glass fascia according to an embodiment hereof.

An embodiment of a glass article or fascia 20 according the present disclosure is diagrammatically illustrated in FIGS. 2 and 3. In some aspects hereof, the glass fascia may be shaped, such as by molding, bending or sagging, such that it has a generally planar central front panel 22 portion, rearward extending side portions 24 and 26, and inwardly extending I inner portions 34 and 36 as illustrated in FIG. 2. The central, side and inner portions of the glass fascia may be substantially flat/planar in configuration. However, select portions of the glass fascia may optionally have a desired ornamental or useful shape or configuration, such as a 2-D or 3-D bow or other more complex shape (not shown). Design parameters for a glass fascia according to various embodiments hereof are designated in FIG. 2, where W is the width of a front portion 22 of the glass fascia, b is the width of side portions 24 and 26 of the fascia that are oriented generally perpendicular to the front portion, c is the width of optional inner portions 34 and 36 of the fascia that extend inward from the side portions 24 and 26 (c=W implies a completely closed glass article), R1 is the radius of curvature of the fascia between the front portion and the side portions, R2 is the radius of curvature of the fascia between the side portions and the edge portions, and T is the thickness of the glass fascia (or of the glass sheet/panel from which the fascia is formed).

FIG. 3 diagrammatically illustrates a glass cover/fascia 30 according to an exemplary embodiment hereof mounted on the front surface of a device 40, such as the door of a domestic refrigerator. The glass fascia may include a layer 22 of relatively thin chemically strengthened glass, such as Corning Gorilla glass. Due to the relatively thin flexible nature of the glass, it may be advantageous to support substantially the entire rear or inner surface of the fascia 22 to inhibit flexing of the glass fascia upon impact or load forces. According to one aspect of the present disclosure, this is accomplished by providing a layer of backer material 25 (the backer or backer sheet) having mechanical properties suitable to support the relatively thin glass fascia 100 and inhibit the localized deformation of the glass fascia under impact or loading forces. The backer sheet may be adhered to the glass sheet with any suitable adhesive, or it may be fused to the glass sheet at an elevated temperature that softens the backer sheet so that it fuses to the glass sheet.

The front portion 22 of the glass fascia may have a width W that is approximately equal to or somewhat larger than the width of the device 40. Although, the width W of the fascia may alternatively only be a fraction of the width of the device, such that fascia only covers a portion of the front of the device. The glass fascia 20 may be mounted to the front (or top or side) of a device by way of rails or other mounting hardware 44 and 46 that is adhered or otherwise fastened to the rear or inner surface of the front portion 22 (or of the side portions 24 and 26 of the fascia). The mounting hardware may be adhered to the inner surface of the fascia using any suitable adhesive material, double sided adhesive tape, such as 3M VHB adhesive tape, or double-sided adhesive foam. The front of the device may be fixed or moveable (e.g. such as a refrigerator or dishwasher door). The mounting hardware 44, 46 is then attached to the front or sides of the device 40 in any suitable manner. The mounting hardware may be removably attached to the device to facilitate removal and replacement of the glass fascia or of portions of the device behind the fascia.

Figure 4:
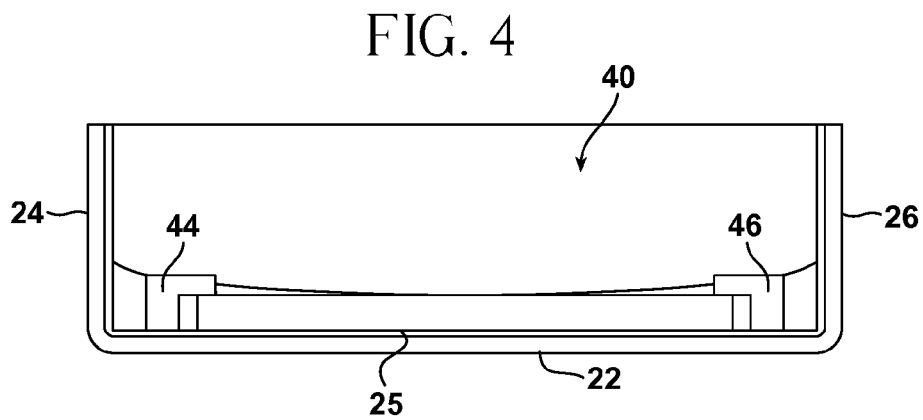
FIG. 4 is a schematic top view of a shaped glass fascia according to a further embodiment hereof.
Figure 5:
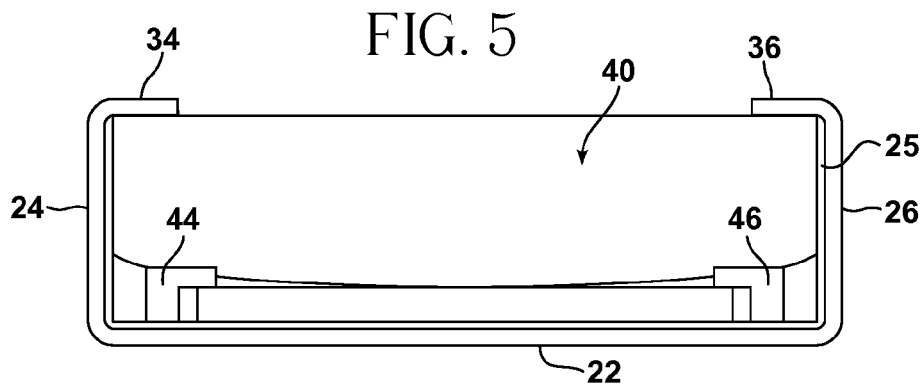
FIG. 5 is a schematic top view of a shaped glass fascia according to a further embodiment hereof.

Edge portions of the fascia may be bent rearward (radius R1) such that the side portions 24 and 26 of the fascia extend rearward from the front potion 22. The side portions 24 and 26 of the fascia may extend rearward from the central portion 22 of the fascia for a sufficient distance to cover the mounting hardware 44, 46 as illustrated in FIG. 3. However, the side portions 24 and 26 may also extend rearward from the front portion a distance sufficient to also cover at least a portion of the sides of the device 40, such the sides of a refrigerator door, as illustrated in FIG. 4. Edge portions of side portions of the fascia may be bent inward (radius R2) such that the inner portions 34 and 36 of the fascia extend inward from the side portions 24 and 26 as illustrated in FIG. 5, thereby partially enclosing and completely obscuring the underlying appliance structure 40. In each case, it may be advantageous to support substantially the entire rear or inner surface of the fascia 22, 24, 26, 34, 36 with a backer sheet 25 to inhibit flexing of the glass fascia upon impact or load forces. The backer sheet may be a single continuous sheet of backer material that is adhere to and covers substantially the entire rear surface of the glass sheet 22. The backer sheet may initially be a flat sheet of material that is adhered to or laminated to a flat glass sheet. The glass-backer laminated structure may then be bent into one of the shapes as illustrated in FIGS. 3, 4 and 5. Alternatively, the backer sheet may be segmented, with a separate flat sheet of backer material being adhered to each segment 22, 24, 26, 34, 36 of the glass sheet. The backer sheet 25 may also be separately bent into one of the desired shapes as illustrated in FIGS. 3, 4 and 5 and then laminated to a glass sheet that has already been bent to the corresponding shape.

Several advantages are achieved by bending the glass fascia to form a complete "cap" wraps substantially entirely around the front and sides of the device as illustrated on FIGS. 4 and 5. One advantage is that the scratch and stain resistance characteristic of the glass fascia is applied across a larger part of the device. Another advantage is that seams between the fascia and the appliance, as well as seams between components of the appliance are either eliminated or covered from view. The lack of seams correlates with customer perception of the device's "quality of build." Seams may appear to be gaps and may be uneven, which creates the impression of a cheap or sloppy construction. Also, since there are less visible external pieces to fit tightly together, eliminating seams also loosens manufacturing tolerances. Moreover, such a wrap around fascia provides a unique and appealing smooth, seamless, glossy glass design style. This construction also covers any interface between the rear of the glass fascia and other materials, such as, for example, any decorative, strengthening, or functional coating, layer or lamination (not shown) that may be on the back of the glass sheet forming the fascia is also covered by the fascia.

The optional coating, layer or lamination may be a printed decorative color or pattern or texture on the back surface of the glass fascia for providing a desired ornamental appearance to the glass appliance. Many applications require acoustic or thermal isolation, which may accomplished with a suitable well known coating or layer laminated on the inner or rear surface of the fascia. This may be accomplished by adding the coating or lamination to the glass sheet forming the fascia.

Figure 6:
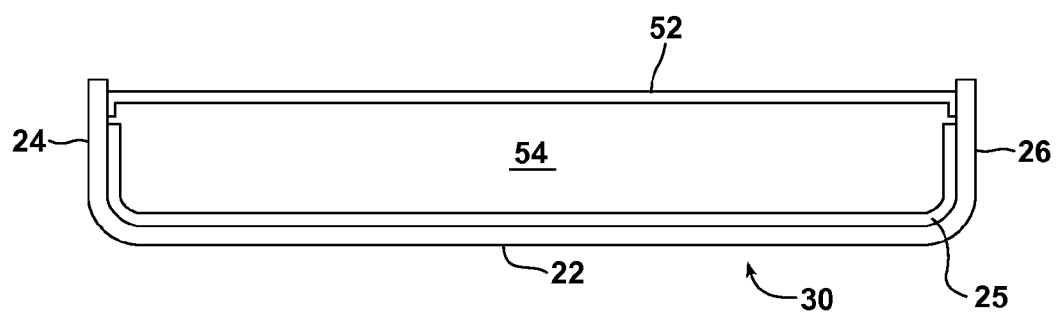
FIG. 6 is a schematic top view of a shaped glass fascia that forms a structural part of the device according to a further embodiment hereof.
Figure 7:
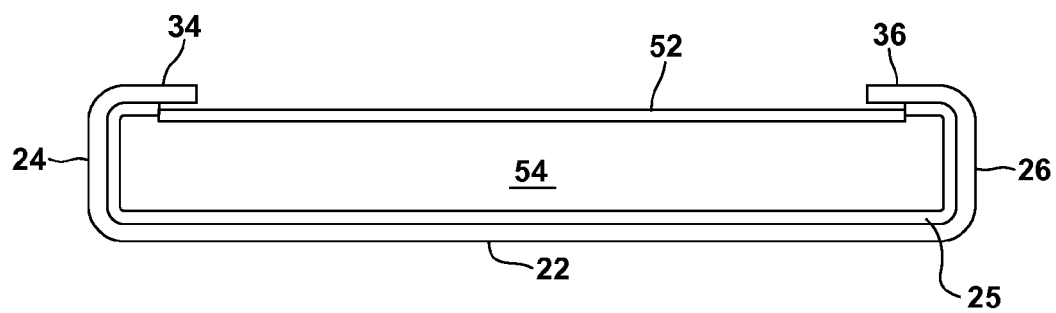
FIG. 7 is a schematic top view of a shaped glass fascia that forms a structural part of the device according to a further embodiment hereof.

According other embodiments hereof, the glass fascia 20, 30 is not just mounted on a portion of the device, but is fully integrated with and forms a portion of the structure of the device as diagrammatically illustrated in FIGS. 6 and 7. A metal, wood, or plastic back plate 52 may be attached to the side portions 24 and 26 of the glass fascia 30 as illustrated in FIG. 6 or to the inner portions 34 and 36 of the glass fascia 20 as illustrated in FIG. 7, thereby substantially enclosing a cavity 54 between the back plate and the front portion 22 of the glass fascia. The back plate 52 may be attached to the glass fascia by any suitable means, such as by bonding the back plate to the fascia with an adhesive or attaching the back plate to the glass cover with clips or other fastening devices.

The cavity 54 between the back plate 52 and the glass fascia 20, 30 may then be filled with insulating foam, as is common in the fabrication of refrigerator doors (see, for example, US20020066258A1). The insulating foam may serve to strengthen the bond between the back plate and glass article, act as an anti-splinter mechanism for the glass article, provide mechanical support and rigidity for the thin glass fascia, and/or provide sound or thermal insulation for the device. Use of a glass fascia in this manner eliminates the need for separate plastic or sheet metal components to form the structure of the device, such as an appliance door, thereby decreasing overall cost.

The glass fascia may be formed from a thin sheet of glass, such as a sheet of Corning® Eagle™ glass. The thin glass sheet may alternatively be formed from a chemically strengthened glass sheet, such as Corning® Gorilla™ glass. By thin, it is meant that the glass has a thickness of about 2 mm or less, about 1 mm or less, or about 0.7 mm or less. The glass fascias disclosed herein may comprise a chemically-strengthened glass sheets. Use of such thin glass sheets to form the fascia allows enable the bending of the glass sheet to form the side portions 24 and 36 and/or the inner portions 34 and 36 with curvatures having a radii of curvatures R1 and R2 that are much smaller than is achievable with relatively thick glass sheets, such as 3.2 mm thick soda lime glass sheets. Relatively small radii of curvature R1 or R2 of 10 mm or less or 5 mm or less may be desirable for providing relatively sharp corners on the fascia for a crisp clean ornamental appearance.

The backer sheet 25 is made of a relatively stiff or rigid material such that it prevents localized areas of the glass fascia from deflecting into the fascia. The backer may have a modulus of elasticity of about 2.0 GPa or more. The backer material may be formed of, by way of example only, polycarbonate (PC), acrylonitrile butadiene styrene (ABS), acrylic, or nylon. The backer sheet may also be formed of glass or ceramic filled polymers. Fiberglass, carbon fiber, other composite stack-ups, ceramics and metals, such as stainless steel, aluminum, copper or brass, may also be used as a backer material. The backer material may be molded onto, sprayed onto, or preformed and bonded onto the glass.

In the case of a stainless steel backer material, a stainless steel outer skin of an appliance may form the backer material. In such a case, the glass fascia may be adhered directly to the outer surface of a stainless steel appliance to provide scratch and dent resistance and ease of cleaning. The backer sheet 25 may also be formed of a laminated in which a hard material with a modulus of elasticity of about 2.0 GPa or more is laminated to an underlying an energy absorbing material having a lower modulus of elasticity. The energy absorbing material may be located on the front or outer surface of the hard material, e.g. between the hard material and the glass, or on the back or inner surface of the hard material.

Suitable thin glass sheets may be chemically strengthened by an ion exchange process. In this process, typically by immersion of the glass sheet into a molten salt bath for a predetermined period of time, ions at or near the surface of the glass sheet are exchanged for larger metal ions from the salt bath. In one embodiment, the temperature of the molten salt bath is about 430° C. and the predetermined time period is about eight hours. The incorporation of the larger ions into the glass strengthens the sheet by creating a compressive stress in a near surface region of the glass. A corresponding tensile stress is induced within a central region of the glass to balance the compressive stress.

Corning Incorporated created a trade mark glass, named Gorilla® glass. As described in its U.S. Pat. No. 7,666,511 B2, 4483700 and 5674790, this glass is made by fusion drawing and then chemical strengthening. The Gorilla glass has a relatively deep depth of layer (DOL) of compressive stress, and presents a relatively high flexural strength, scratch resistance and impact resistance. As shown by ball drop test data, 1 mm thick Gorilla glass has a comparable impact resistance in ball drop with 3.2 mm thick tempered Soda Lime glass. The advantage of Gorilla glass enables the possibility of producing a lighter weight glass panel for household appliances and other relatively large devices. In addition, the relatively thin Gorilla glass presents superior capacitive touch function sensitivity, which enables a better integration of any kind of display and other control touch panel into the front surface of the device.

Example ion-exchangeable glasses that are suitable for forming glass laminates are alkali-aluminosilicate glasses or alkali-aluminoborosilicate glasses, though other glass compositions are contemplated. As used herein, "ion exchangeable" means that a glass is capable of exchanging cations located at or near the surface of the glass with cations of the same valence that are either larger or smaller in size. One example glass composition comprises $SiO_2$, $B_2O_3$ and $Na_2O$, where $(SiO_2+B_2O_3) \geq 66$ mol. %, and $Na_2O \geq 9$ mol. %. In an embodiment, the glass sheets include at least 6 wt. % aluminum oxide. In a further embodiment, a glass sheet includes one or more alkaline earth oxides, such that a content of alkaline earth oxides is at least 5 wt. %. Suitable glass compositions, in some embodiments, further comprise at least one of $K_2O$, MgO, and CaO. In a particular embodiment, the glass can comprise 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

A further example glass composition suitable for forming glass laminates comprises: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; where 12 mol. % $\leq (Li_2O+Na_2O+K_2O) \leq 20$ mol. % and 0 mol. % $\leq (MgO+CaO) \leq 10$ mol. %.

A still further example glass composition comprises: 63.5-66.5 mol. % $SiO_2$; 8-12 mol. % $Al_2O_3$; 0-3 mol. % $B_2O_3$; 0-5 mol. % $Li_2O$; 8-18 mol. % $Na_2O$; 0-5 mol. % $K_2O$; 1-7 mol. % MgO; 0-2.5 mol. % CaO; 0-3 mol. % $ZrO_2$; 0.05-0.25 mol. % $SnO_2$; 0.05-0.5 mol. % $CeO_2$; less than 50 ppm $As_2O_3$; and less than 50 ppm $Sb_2O_3$; where 14 mol. % $\leq (Li_2O+Na_2O+K_2O) \leq 18$ mol. % and 2 mol. % $\leq (MgO+CaO) \leq 7$ mol. %.

In a particular embodiment, an alkali-aluminosilicate glass comprises alumina, at least one alkali metal and, in some embodiments, greater than 50 mol. % $SiO_2$, in other embodiments at least 58 mol. % $SiO_2$, and in still other embodiments at least 60 mol. % $SiO_2$, wherein the ratio $$\frac{Al_2O + B_2O_3}{\sum \text{modifiers}} > 1,$$

where in the ratio the components are expressed in mol. % and the modifiers are alkali metal oxides. This glass, in particular embodiments, comprises, consists essentially of, or consists of: 58-72 mol. % $SiO_2$; 9-17 mol. % $Al_2O_3$; 2-12 mol. % $B_2O_3$; 8-16 mol. % $Na_2O$; and 0-4 mol. % $K_2O$, wherein the ratio $$\frac{Al_2O + B_2O_3}{\sum \text{modifiers}} > 1.$$

In another embodiment, an alkali-aluminosilicate glass comprises, consists essentially of, or consists of: 61-75 mol. % $SiO_2$; 7-15 mol. % $Al_2O_3$; 0-12 mol. % $B_2O_3$; 9-21 mol. % $Na_2O$; 0-4 mol. % $K_2O$; 0-7 mol. % MgO; and 0-3 mol. % CaO.

In yet another embodiment, an alkali-aluminosilicate glass substrate comprises, consists essentially of, or consists of: 60-70 mol. % $SiO_2$; 6-14 mol. % $Al_2O_3$; 0-15 mol. % $B_2O_3$; 0-15 mol. % $Li_2O$; 0-20 mol. % $Na_2O$; 0-10 mol. % $K_2O$; 0-8 mol. % MgO; 0-10 mol. % CaO; 0-5 mol. % $ZrO_2$; 0-1 mol. % $SnO_2$; 0-1 mol. % $CeO_2$; less than 50 ppm $As_2O_3$; and less than 50 ppm $Sb_2O_3$; wherein 12 mol. % $\leq Li_2O+Na_2O+K_2O \leq 20$ mol. % and 0 mol. % $\leq MgO+CaO \leq 10$ mol. %.

In still another embodiment, an alkali-aluminosilicate glass comprises, consists essentially of, or consists of: 64-68 mol. % $SiO_2$; 12-16 mol. % $Na_2O$; 8-12 mol. % $Al_2O_3$; 0-3 mol. % $B_2O_3$; 2-5 mol. % $K_2O$; 4-6 mol. % MgO; and 0-5 mol. % CaO, wherein: 66 mol. % $\leq SiO_2+B_2O_3+CaO \leq 69$ mol. %; $Na_2O+K_2O+B_2O_3+MgO+CaO+SrO>10$ mol. %; 5 mol. % $\leq MgO+CaO+SrO \leq 8$ mol. %; $(Na_2O+B_2O_3)-Al_2O_3 \leq 2$ mol. %; 2 mol. % $\leq Na_2O-Al_2O_3 \leq 6$ mol. %; and 4 mol. % $\leq (Na_2O+K_2O)-Al_2O_3 \leq 10$ mol. %.

The glass, in some embodiments, is batched with 0-2 mol. % of at least one fining agent selected from a group that includes $Na_2SO_4$, NaCl, NaF, NaBr, $K_2SO_4$, KCl, KF, KBr, and $SnO_2$.

In one example embodiment, sodium ions in the glass can be replaced by potassium ions from the molten bath, though other alkali metal ions having larger atomic radii, such as rubidium or cesium, can replace smaller alkali metal ions in the glass. According to particular embodiments, smaller alkali metal ions in the glass can be replaced by $Ag^+$ ions.

Similarly, other alkali metal salts such as, but not limited to, sulfates, halides, and the like may be used in the ion exchange process.

The replacement of smaller ions by larger ions at a temperature below that at which the glass network can relax produces a distribution of ions across the surface of the glass that results in a stress profile. The larger volume of the incoming ion produces a compressive stress (CS) on the surface and tension (central tension, or CT) in the center of the glass. The compressive stress is related to the central tension by the following relationship:

$$CS = CT\left(\frac{t - 2DOL}{DOL}\right)$$

where t is the total thickness of the glass sheet and DOL is the depth of exchange, also referred to as depth of layer.

According to various embodiments, thin glass laminates comprising one or more sheets of ion-exchanged glass and having a specified depth of layer versus compressive stress profile possess an array of desired properties, including low weight, high impact resistance, and improved sound attenuation.

In one embodiment, a chemically-strengthened glass sheet can have a surface compressive stress of at least 300 MPa, e.g., at least 400, 500, or 600 MPa, a depth of at least about 20 μm (e.g., at least about 20, 25, 30, 35, 40, 45, or 50 μm) and/or a central tension greater than 40 MPa (e.g., greater than 40, 45, or 50 MPa) and less than 65 MPa (e.g., less than 65, 60, or 55 MPa).

Figure 8:
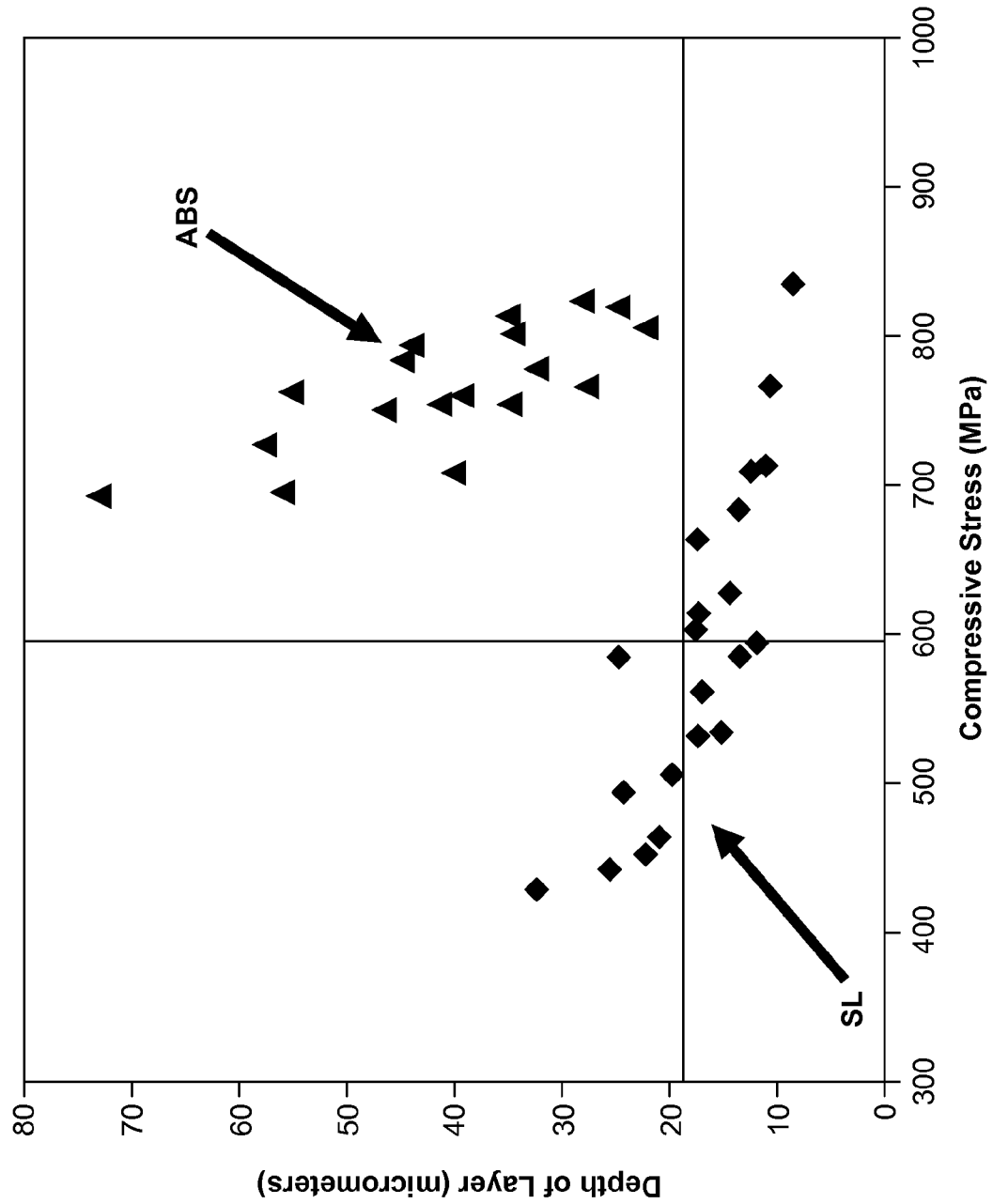
FIG. 8 is a depth of layer versus compressive stress plot for various glass sheets according to one embodiment.

An example embodiment is illustrated in FIG. 8, which shows a depth of layer versus compressive stress plot for various glass sheets. In FIG. 8, data from a comparative soda lime glass are designated by diamonds "SL" while data from chemically-strengthened aluminosilicate glasses are designated by triangles "ABS." As shown in the illustrated embodiment, the depth of layer versus surface compressive stress data for the chemically-strengthened sheets can be defined by a compressive stress of greater than about 600 MPa, and a depth of layer greater than about 20 micrometers.

Figure 9:
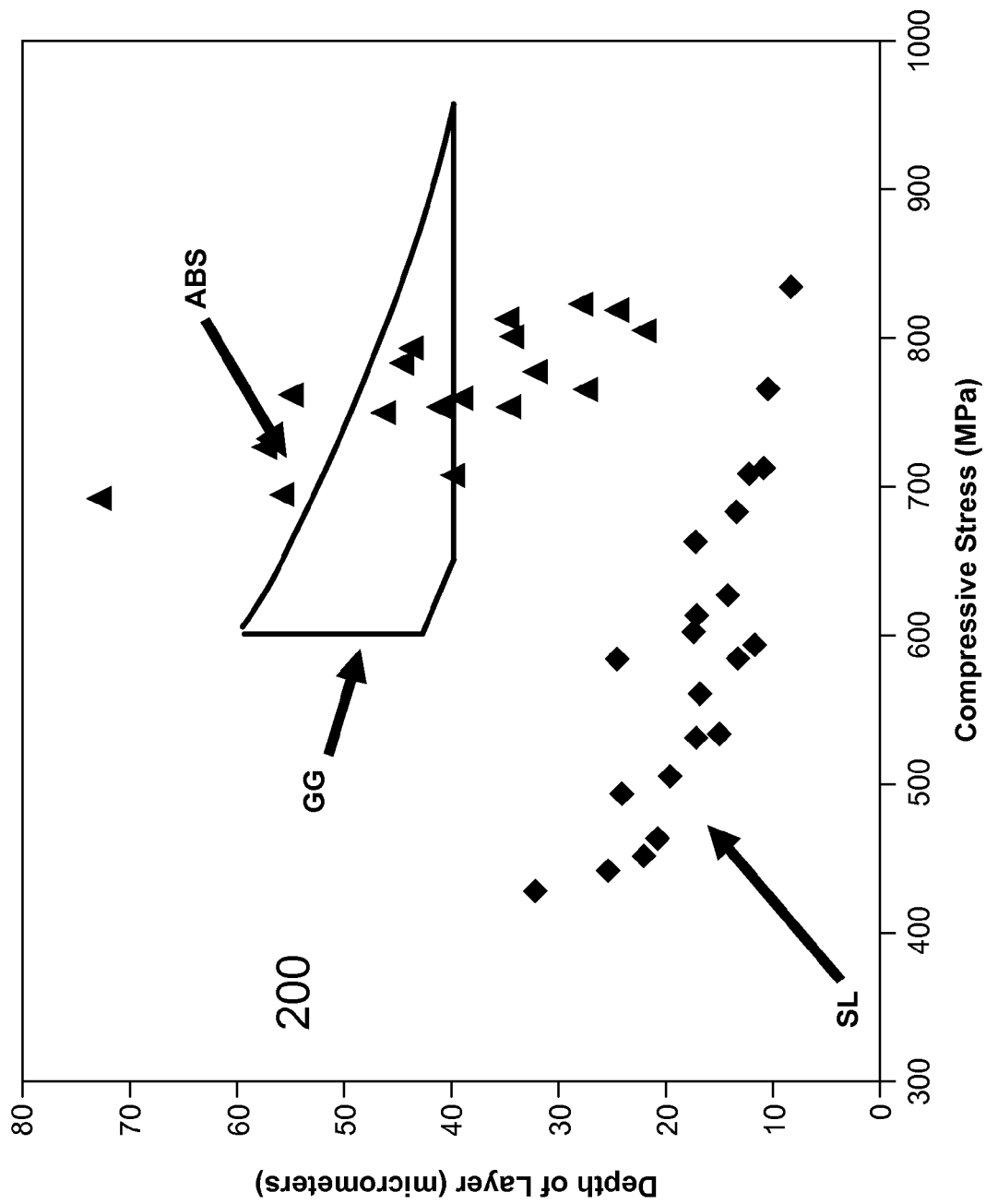
FIG. 9 is a depth of layer versus compressive stress plot for various glass sheets according to another embodiment.

FIG. 9 shows the data of FIG. 8 where a region 200 is defined by a surface compressive stress greater than about 600 MPa, a depth of layer greater than about 40 micrometers, and a tensile stress between about 40 and 65 MPa.

Figure 10:
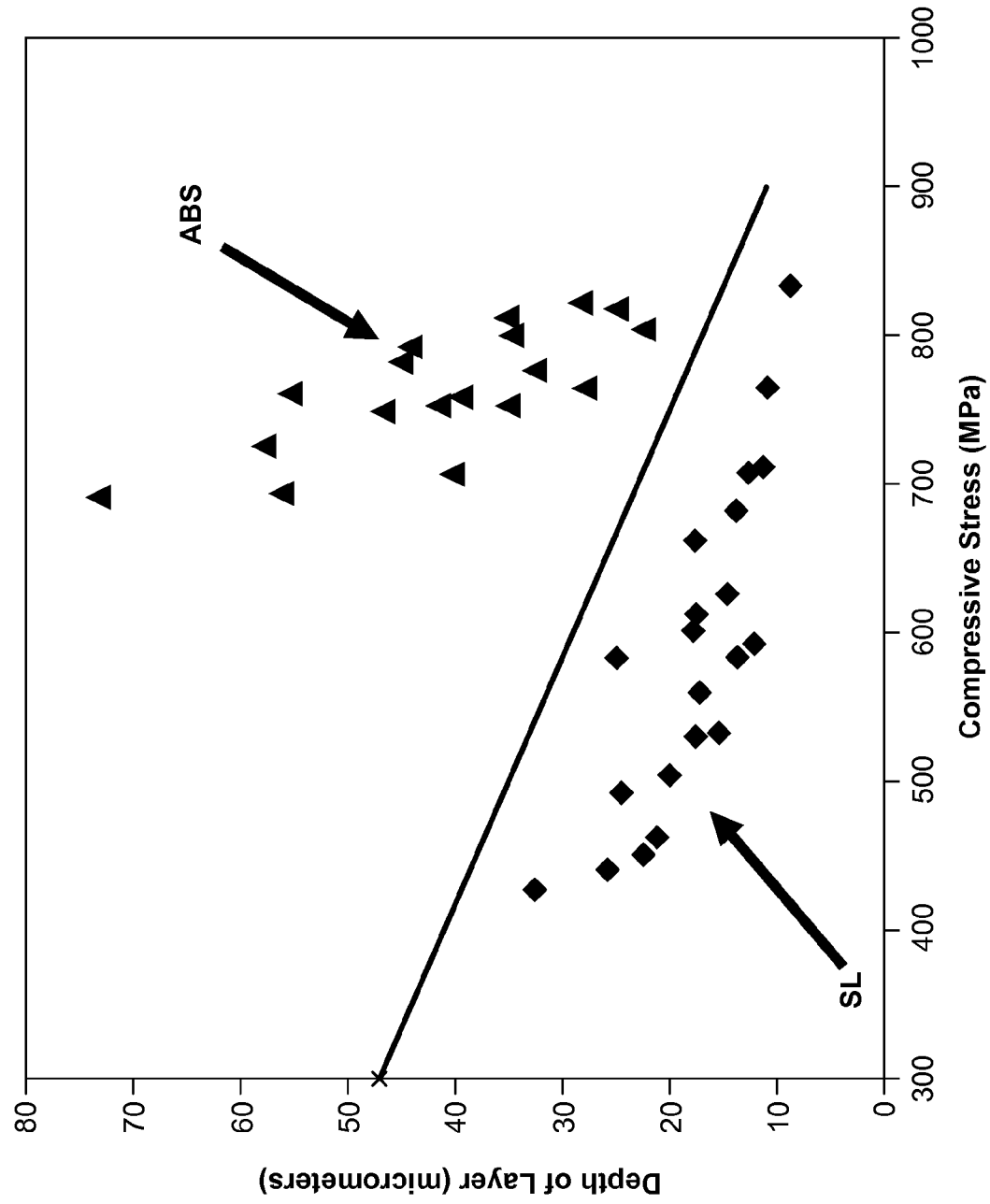
FIG. 10 is a depth of layer versus compressive stress plot for various glass sheets according to a further embodiment.
Figure 11:
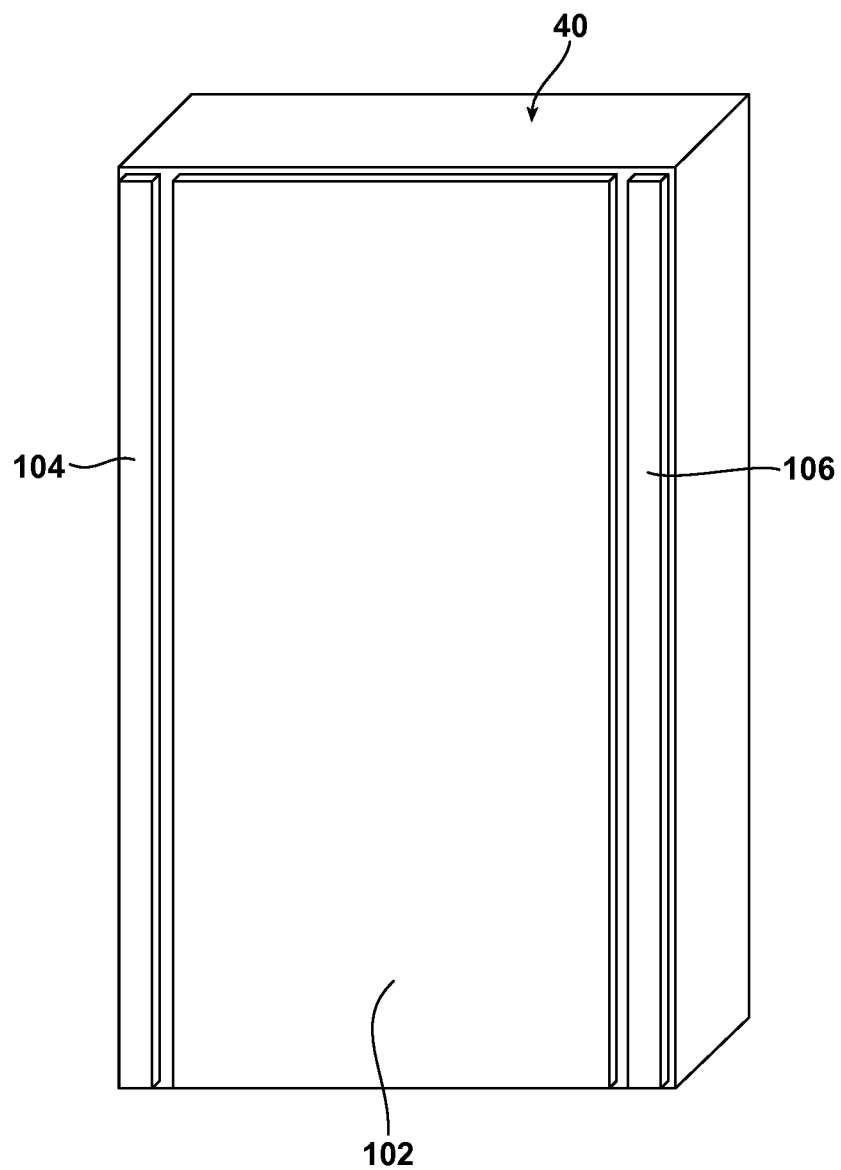
FIG. 11 schematic perspective front view of mounting rails and backing plate according to a mounting arrangement according to a further embodiment hereof.

Independently of, or in conjunction with, the foregoing relationships, the chemically-strengthened glass can have depth of layer that is expressed in terms of the corresponding surface compressive stress. In one example, the near surface region extends from a surface of the first glass sheet to a depth of layer (in micrometers) of at least 65-0.06 (CS), e.g. above a line defined by 65-0.06 (CS) on a plot of depth of layer on the x axis and CS on the y axis, where CS is the surface compressive stress and CS is at least 300 MPa. This relationship is pictured in FIG. 10, which shows the data of FIG. 8.

In a further example, the near surface region extends from a surface of the first glass sheet to a depth of layer (in micrometers) of at least B-M(CS), e.g. above a line defined by B-M(CS) on a plot of depth of layer on the x axis and CS on the y axis, where CS is the surface compressive stress and CS is at least 300 MPa. In the foregoing expression, B can range from about 50 to 180 (e.g., 60, 70, 80, 90, 100, 110, 120, 130, 140, 150, 160±5), and M can range independently from about −0.2 to −0.02 (e.g., −0.18, −0.16, −0.14, −0.12, −0.10, −0.08, −0.06, −0.04±−0.01).

Example glass sheet forming methods include fusion draw and slot draw processes, which are each examples of a down-draw process, as well as float processes. The fusion draw process uses a drawing tank that has a channel for accepting molten glass raw material. The channel has weirs that are open at the top along the length of the channel on both sides of the channel. When the channel fills with molten material, the molten glass overflows the weirs. Due to gravity, the molten glass flows down the outside surfaces of the drawing tank. These outside surfaces extend down and inwardly so that they join at an edge below the drawing tank. The two flowing glass surfaces join at this edge to fuse and form a single flowing sheet. The fusion draw method offers the advantage that, because the two glass films flowing over the channel fuse together, neither outside surface of the resulting glass sheet comes in contact with any part of the apparatus. Thus, the surface properties of the fusion drawn glass sheet are not affected by such contact.

The slot draw method is distinct from the fusion draw method. Here the molten raw material glass is provided to a drawing tank. The bottom of the drawing tank has an open slot with a nozzle that extends the length of the slot. The molten glass flows through the slot/nozzle and is drawn downward as a continuous sheet and into an annealing region. The slot draw process can provide a thinner sheet than the fusion draw process because only a single sheet is drawn through the slot, rather than two sheets being fused together.

Down-draw processes produce surfaces that are relatively pristine. Because the strength of the glass surface is controlled by the amount and size of surface flaws, a pristine surface that has had minimal contact has a higher initial strength. When this high strength glass is then chemically strengthened, the resultant strength can be higher than that of a surface that has been a lapped and polished. Down-drawn glass may be drawn to a thickness of less than about 2 mm. In addition, down drawn glass has a very flat, smooth surface that can be used in its final application without costly grinding and polishing.

In the float glass method, a sheet of glass that may be characterized by smooth surfaces and uniform thickness is made by floating molten glass on a bed of molten metal, typically tin. In an example process, molten glass that is fed onto the surface of the molten tin bed forms a floating ribbon. As the glass ribbon flows along the tin bath, the temperature is gradually decreased until a solid glass sheet can be lifted from the tin onto rollers. Once off the bath, the glass sheet can be cooled further and annealed to reduce internal stress.

The thin chemically strengthened glass forming the glass fascia described herein may also be processed by a series of steps to provide the fascia with the desired size, surface texturing, compressive stress profile, controlled fragmentation, decorative images, functional coating or lamination, or other features. Some of these steps, such as the cutting slots or holes 210 through the glass fascia 100 for the attachment of handles or other elements (not shown) to the front of the devise through the slots, may create some level of surface or subsurface damage to the glass. Such damage may be managed with steps that may include further chemical strengthening or additional treatment for fragmentation, such as application of a protective coating, in order to prevent subsequent fracturing of the glass fascia under impact, load, or thermal stresses due to this residual damage. Edge surface damage or subsurface damage may be minimized in the first instance by optimizing the mechanical or chemical cutting processes used to cut the slots. Mechanical and chemical finishing or edging processes may also be used to finish the cut surfaces and edges. A surface texturing process may be employed to add some aesthetic decoration futures 220. Processes for surface roughening may include sand blasting, laser writing, thermal rolling, and hot embossing. Fragmentation treatment can be realized through extended ion exchanging, thermal annealing a combination of the two, or through suitable coatings or laminations. The decoration printing process may be conducted by an ink (organic) based digital printing, organic silk screen painting, or an inorganic coating step. The whole process is optimized to maintain or improve the mechanical properties of the glass panel, minimize residual damage from cutting and other processes, and to extend its decoration function.

Glass sheets can be used to form glass laminates. As defined herein, a glass laminate comprises at least one chemically-strengthened glass sheet having a polymer interlayer formed over a major surface thereof. The polymer interlayer can comprise a monolithic polymer sheet, a multilayer polymer sheet, or a composite polymer sheet. The polymer interlayer can be, for example, a plasticized polyvinyl butyral (PVB) sheet. Glass laminates can be formed using a variety of processes. In an example process, one or more sheets of chemically-strengthened glass sheets are assembled in a prepress with a polymer interlayer, tacked into a pre-laminate, and finished into an optically clear glass laminate.

The weight savings associated with using thinner glass sheets for forming glass fascias for devices can be seen with reference to Table 1, which shows the glass weight for exemplary glass fascia for a refrigerator having an areal dimension of 170 cm×80 cm.

TABLE 1

Weight of glass fascia.

| Thickness (mm) | Glass Weight (g) |
|---|---|
| 4 | 13548 |
| 3 | 10163 |
| 2 | 6775 |
| 1.4 | 4742 |
| 1 | 3388 |
| 0.7 | 2371 |
| 0.5 | 1694 |

As can be seen with reference to Table 1, by decreasing the thickness of the glass sheet that comprises a glass fascia, the total weight of the fascia can be dramatically reduced. In some applications, a lower total weight translates. Use of thin lightweight glass for the fascias may provide for (1) ease of fascia or device component handling due to reduced weight (which reduces the risk of damage and injury), (2) reduced material cost due to use of less glass material; and (3) reduced manufacturing equipment/capital cost through use of lower duty manufacturing equipment due to reduced component and assembly weight.

As previously discussed herein glass fascias have typically been mounted on appliances at the edges of the fascia only. Such a mounting arrangement that supports the glass only at the edges is unsatisfactory for a relatively thin glass fascia. An unsupported thin glass fascia deflects under pressure or an impact force. In the event of a localized pressure/loading or impact force, a localized deflection of the glass is created such that the glass is locally bent or curved with relatively small radius of curvature. The convexly curved side of the bent glass sheet is placed in a state of high tension stress that can cause the glass to fracture. Thus, unsupported thin glass fascias are prone to fracture upon impact or loading.

According to a further embodiment hereof, a light weight, quick releasable mounting assembly for a thin glass fascia 100 will now be described with reference to FIGS. 11 through 14. As previously described herein, the glass fascia of all embodiments hereof may includes a layer of relatively thin chemically strengthened glass, such as Corning Gorilla glass. Due to the relatively thin flexible nature of the glass, it is advantageous to support substantially the entire rear or inner surface of the fascia to inhibit flexing of the glass fascia upon impact or load forces. According to one aspect of the present disclosure, this is accomplished by providing a layer of backer material 102 (the backer or backer sheet) having mechanical properties suitable to support the relatively thin glass fascia 100 and inhibit the localized deformation of the glass fascia under impact or loading forces. The backer may be adhered to the inner surface of the fascia to the outer surface of the device under the fascia.

Figure 12A:
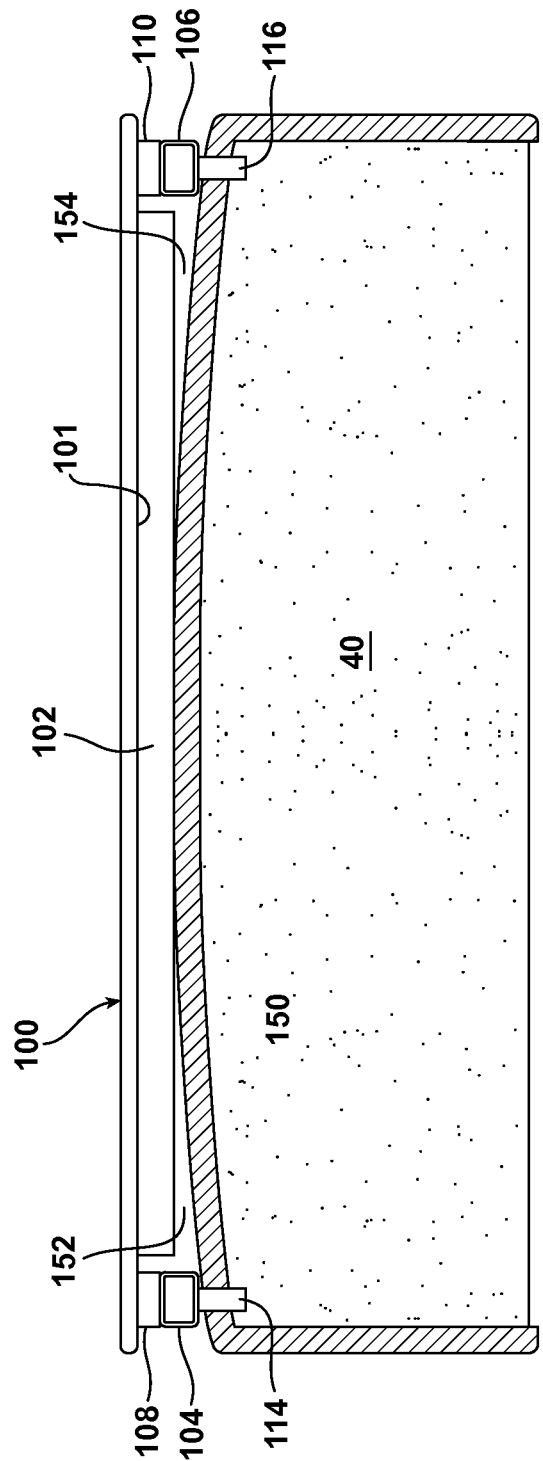
FIG. 12A is a schematic top view of a glass fascia and mounting arrangement according to a further embodiment hereof.

As illustrated in FIG. 12A, the mounting assembly may also include support rails 104 and 106, which may be made of steel or other suitable material. The support rails may be adhered to the inner surface of the glass fascia with any suitable adhesive material, double-sided adhesive tape, such as 3M VHB adhesive tape, or double-sided adhesive foam 108 and 110. Each support rail may have one or more spring clips or hooks 114, 116, or other releasable fastening device, in order to enable the quick reliable attachment and detachment of the support rails to the device 40. As best described in FIG. 14, a slot 118 is opened on the outer panel 120 of the device (such sheet steel), such as a refrigerator door, and a void 120 is made in the expanded polyurethane foam 122. With this construction, the quick release spring clips or hook 114 and 116 can be inserted through the slots 118 into the interior of the device to connect the whole glass/backer assembly onto the front panel of the device. With this construction, the entire fascia assembly may be easily detached and re-attached for repair or replacement of the fascia due to damage or when remodeling, etc. The spring clips or hooks may be made of the same material as and integrally with the support rails in one body, or may be made of a different materials/component and attached to the support rails. The backer 102 may be somewhat smaller in width than the width W of the glass fascia, so as to allow two support rails to be bonded directly to outer side edge portions of the inner surface of the fascia. The support rails may be bonded to the fascia using adhesive, adhesive tape or adhesive foam. It may be advantageous for the outermost portion, e.g. the center, of a bowed appliance door or other bowed surface contact and support the inner surface of the backer sheet 102, as illustrate in FIG. 12A, to ensure or enhance a solid rigid feel the fascia on the appliance.

Figure 12B:
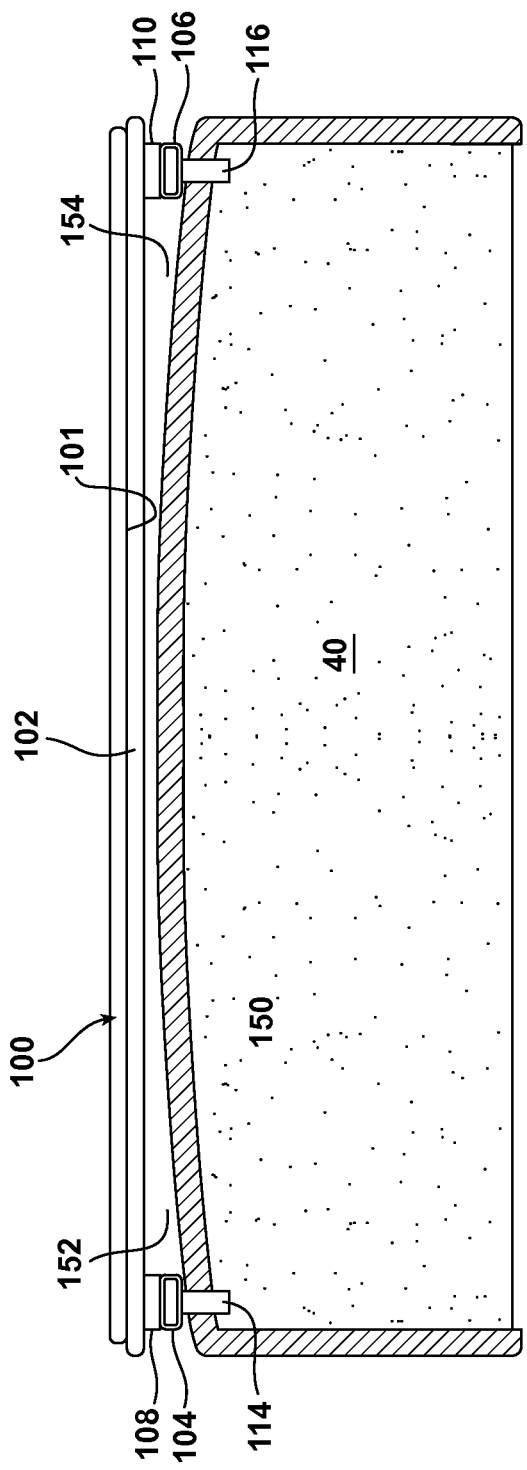
FIG. 12B is a schematic top view of a glass fascia laminate structure according to another embodiment hereof.

As illustrated in FIG. 12A, the backer sheet (or just the backer) 102 supports may extend substantially completely between the support rails 104 and 106 and substantially completely from the top edge of the fascia to the bottom edge of the fascia in order to support substantially the entire rear surface of the front central portion of the fascia and inhibits deflection of the front central portion of the fascia upon impact or load forces. Alternatively, the backer sheet 102 may extend slightly beyond the side edges (and maybe also the top and bottom edges) of the glass fascia 100 as illustrated in FIG. 12B, in order to protect the edges of the glass from impacts. The outer edges of the backer sheet may be formed with a step or ledge that wraps around the edges of the glass (not shown). A front or outer surface of the step may be flush with the outer surface of the glass sheet (not shown), in order to provide an appealing smooth flush front surface of the fascia. Alternatively, the step may wrap around over the front or outer surface of the glass sheet of the fascia, such that the glass sheet is securely gripped and retained by the backer (not shown).

The external surfaces of many devices are not perfectly planar, e.g. they are non-planar. For example, devices such as refrigerator doors are typically formed of thin sheet metal outer panel 150 and are filled with expanding insulating foam. The expanding insulating foam tends to cause the outer panel 150 to bow outwardly as illustrated in FIGS. 12A and 12B. As result of this bow in the outer surface of the device under the fascia, if the backer material is an economical flat planar sheet of material having a uniform thickness with its outer surface adhered to the inner surface of the fascia, then gaps 152 and 154 are created between an inner surface of the backer and the outer surface of the device. These gaps allow the backer to deflect near the outer side edges of the fascia, thereby partially nullifying the support function of the backer.

Figure 15:
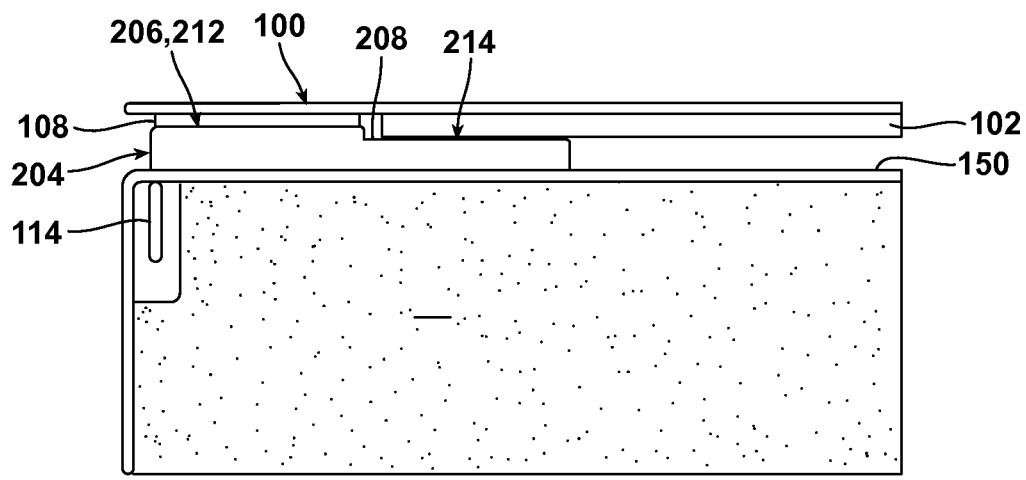
FIG. 15 is a schematic top view a glass fascia mounting arrangement according to a further embodiment hereof.

According to a further embodiment hereof illustrated in FIG. 15, modified support rails (only support rail 204 is illustrated) may be formed with recessed support seats 214 for receiving outer edge portions of the backer 102. The support seats may be formed of the same material as the backer, the same material as the support rails, or some other suitable material. The backer seats may alternatively be formed of separate pieces that are mounted to the front of the devices adjacent to the support rails. The support rails 204 are thus formed with step-shaped cross section (or an L-shape shoe) having a first step 212 and a recessed second step 214 (the support seat). The outer surface the first step 212 of the support rail supports the glass fascia 100. The outer surface of the second step 214 (the support seat) supports the outer edge portions of the backer 102. The distance between the outer surface of the first step portion and the outer surface of the second step portion selected to approximately equal the thickness of the backer 102 and any adhesive or tape 108 or other material between the outer surface of the second step portion and the inner surface of the glass fascia.

When a reflective fascia/front panel, such as a glass fascia as described herein, is employed on a device, it may be desirable that the fascia remain substantially flat or planar so that images reflected by the fascia do not appear to be distorted. Distorted reflection may create an impression of a low quality assembly. With the previously described support seat and backer arrangement, the outer edge portions of the backer are supported and substantially prevented from deflecting inwardly under an impact force or load on the outer surface of the fascia. Thin glass fascias may in this manner be mounted on an appliance door or other device with a warp of less than 5 mm. The described glass backer arrangement is able to maintain the glass front flat (substantially planar) even with a relatively large degree of warp in the front/outer surface of the device through increasing the height of supporting rails and the support seats.

The backer 102 may be attached to the inner surface of the fascia panel by bonding the entire outer surface of the backer to the inner surface of the glass fascia. This bond can be achieved using a pressure-sensitive adhesive material, such as Scapa's UP2040 50 micron thick acrylic adhesive. Such an adhesive can laminate the backer to the glass using a pressure-roll laminator, an autoclave, or other methods. Alternative adhesives that maybe employed include thermoplastic adhesives, such as thermoplastic urethane (TPU) or ethylene vinyl-acetate (EVA), which would require autoclaving or a heated pressure-roll laminator to sufficiently heat the adhesive and cause it to bond the backer to the glass.

Due to a virtually inevitable difference (mismatch) between the coefficient of thermal expansion (CTE) of the glass of the fascia and the CTE of the material of the backer, stresses may be created in the fascia and the backer as result of variations or changes in the ambient temperature. Such stresses may cause the backer or glass fascia to warp or ripple. The effect of CTE mismatch between the glass and the backer maybe minimized by only partially bonding the outer surface of the backer to the inner surface of the fascia, e.g. by only bonding one or more discrete portions of the backer to the glass fascia or to the device. For example, just a center portion and/or just corner portions (such as circular or other shaped spots) of the outer surface of the backer may be bonded to the inner surface of the fascia.

The backer 102 and support seat arrangements previously described herein, or variations thereof, may be employed with all of the glass fascia embodiments described herein to support the backer and substantially inhibit the localized deformation/deflection of the glass fascia that occurs under localized impact or load forces, in order to improve the impact resistance and impression of quality of the fascia on the device. The backer may have a modulus of elasticity of about 2.0 GPa or more. The backer may be a polycarbonate sheet with a thickness of about 1.5 mm. However, depending upon the specific requirements of the product application, other thicknesses and materials, such as acrylic, nylon, unplasticized PVC, may be employed to form the backer.

Figure 13:
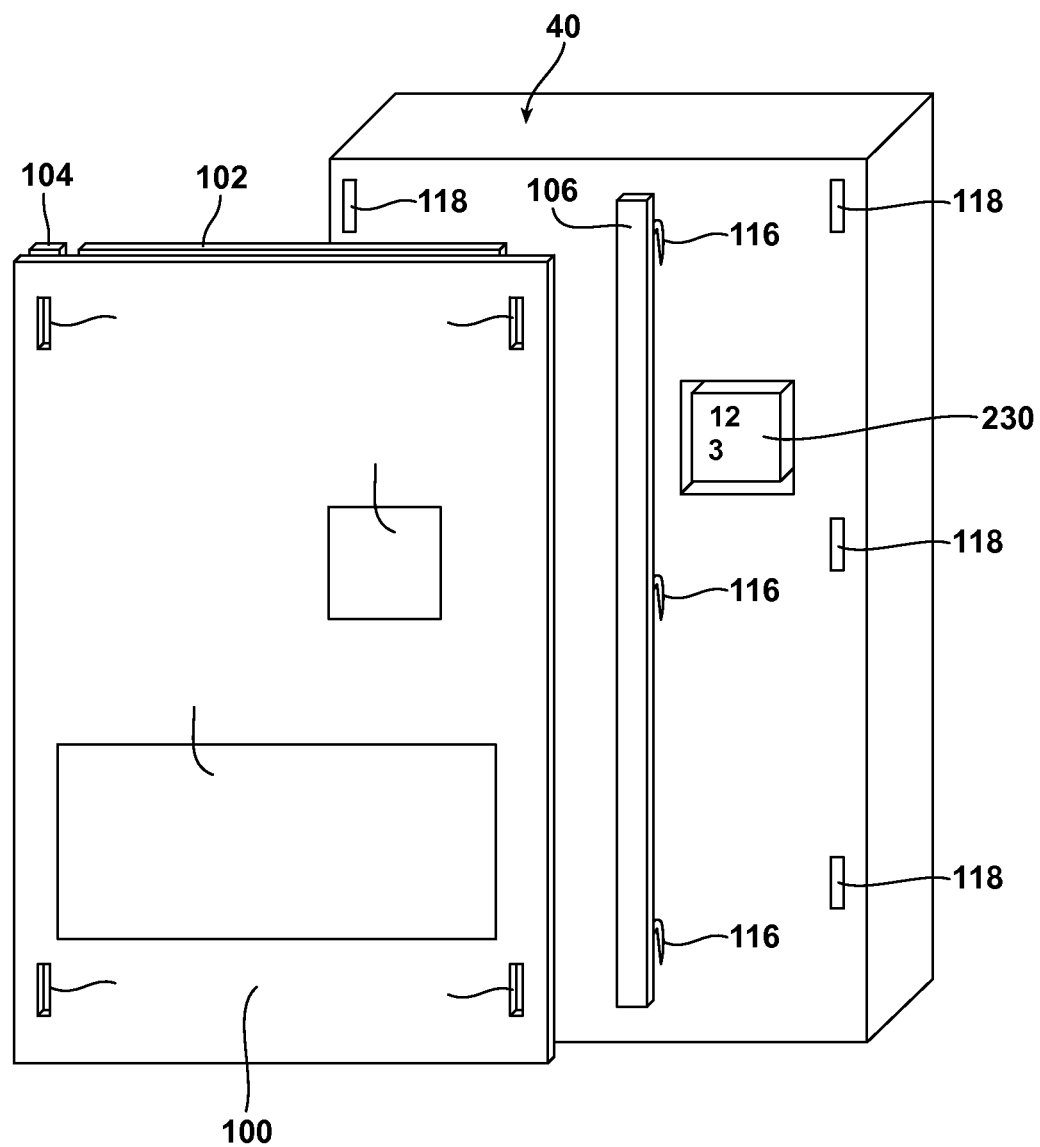
FIG. 13 is a schematic perspective view of the glass fascia mounting arrangement of FIG. 11.
Figure 14:
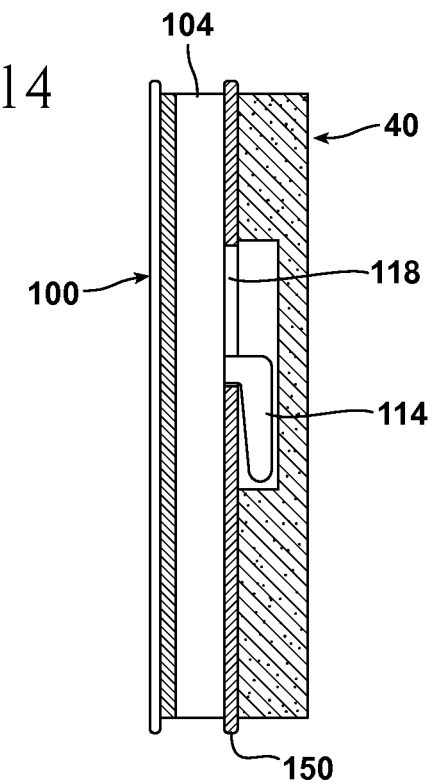
FIG. 14 is a partial side sectional view of the glass fascia mounting arrangement of FIG. 11.

According to another embodiment hereof as diagrammatically illustrated in FIG. 13 seamless incorporation of a display and/or control panel 230 into the front or top of a device may be accomplished by mounting such a display and/or control panel between the glass fascia and the front of the device. A display and/or touch control panel, such as a capacitive touch LCD control panel, may be mounted to the outer surface of the device. A display or control panel 230 may be mounted to the exterior of the appliance's structural members, or in a cavity formed in the fort of the device as illustrated in FIG. 13. Mounting the display or control panel to the exterior front or top surface of the device eliminates the need for the costly fabrication of a cavity in the front of the device. Such a cavity may also detrimentally affect the structural integrity or the thermal insulating properties of the front of the device, such as a refrigerator door. The display or control panel may alternatively be bonded to the inner surface of the fascia.

As illustrated in FIG. 13, the rear of the glass fascia 100 may be coated or laminated with a decorative layer, such a layer of ink, frit or other material, to provide a desired color, pattern, image, or other appearance effect to the fascia. An area 232 of the fascia over a display or control panel 230 may remain uncoated, so that this portion of the fascia is transparent for viewing the display of control panel. Optionally, the glass fascia may be coated to provide a controlled transparency, variable transparency, or one way mirror effect, such that the display or control panel is only visible when activated or illuminated.

The display of control panel may be mounted such that the front of the display or control panel is closely adjacent to the inner surface of the glass fascia (e.g. within a distance D of about 5 mm or less from the inner/rear surface of the fascia). Such an arrangement that closely mounts the display or control panel closely adjacent to a relatively thin a glass fascia according to all embodiments hereof can substantially eliminate the "tunnel effect" when viewing the display. The display or touch control panel may be connected to the appliance through a standard connector that provides the required DC operating voltage and communication signals between the display and the appliance controller.

This description provides a light weight, durable decorative glass fascia for relatively large devices such as, for example, household appliances that have a high scratch resistance, a better-controlled fragmentation pattern and a better decoration effect. This description also provides a mounting arrangement that fully supports a relatively thin glass fascia to prevent fracturing of the fascia under localized impact or load forces. A quickly releasable mounting arrangement for such a glass fascia that provides easy upgrade of the fascia or access to a display under the fascia is also described. The glass fascia may be designed for fragmentation or safety breakage size or pattern requirements by using suitable coatings or laminates constructions that retain the glass fragments in place if broken, and/or tailoring glass stress profile to secure a safe fragmentation pattern.

The described thin glass fascia provides enhanced touch sensitivity for touch control panes located under the fascia, compared with thicker soda lime typically used on larger device such as appliances. This enable the seamless incorporation of display or touch control panels under a full front glass fascia, thereby providing an ornamental smooth, full front fascia currently sought for larger devices such as household appliances. The described quick release mechanism enables ease of repair and replacement if the fascia, display panel, or control panel is damaged or should the device's desire to update an out-of-date fascia, display panel, or control panel. The described fascia can enhance the decoration function of household appliances by adding a decoration layer on the backside of Gorilla glass, and/or texturing the top surface of the same. The Gorilla/backer assembly with raised rails and quick release mechanisms can maintain a flat front even if the front of the device includes a large degree of warp or non-planarity.

The glass fascias can be substantially flat or shaped for certain applications. For instance, the glass fascias can be formed as bent or shaped parts for use as decorative shaped fascias that wrap around the edges of a device, such as an appliance door, as previously described herein. The shape of the glass fascia may be simple or complex. In certain embodiments, a shaped glass fascia may have a complex curvature where the glass sheets have a distinct radius of curvature in one or two independent directions. Such shaped glass sheets may thus be characterized as having "cross curvature," where the glass is curved along an axis that is parallel to a given dimension and also curved along an axis that is perpendicular to the same dimension. Methods for bending and/or shaping glass fascias to form such curvatures and to form radii R1 and R2 previously described herein can include gravity bending, press bending, vacuum forming and methods that are hybrids thereof.

In a traditional method of gravity bending thin, flat sheets of glass into curved shapes such as appliance fascias, cold, pre-cut single or multiple glass sheets are placed onto the rigid, pre-shaped, peripheral metal support surface of a bending fixture. Prior to bending, the glass typically is supported only at a few contact points. The glass is heated, usually by exposure to elevated temperatures in a lehr, which softens the glass allowing gravity to sag or slump the glass into conformance with the peripheral support surface. Substantially the entire support surface generally will then be in contact with the periphery of the glass.

A related technique is press bending where flat glass sheets are heated to a temperature corresponding substantially to the softening point of the glass. The heated sheets are then pressed or shaped to a desired curvature between male and female mold members having complementary shaping surfaces.

A thickness of the glass sheet forming the fascias can have a thickness of from 0.5 to 2 mm (e.g., 0.1, 0.2, 0.3, 0.5, 0.7, 1, 1.4, 1.7, or 2 mm). In embodiments, a chemically-strength- ened glass sheet can have a thickness of less than about 1.0 mm or less than about 0.7 mm.

Applicants have shown that the glass fascia structures disclosed herein have excellent durability, impact resistance, toughness, and scratch resistance. As is well known among skilled artisans, the strength and mechanical impact performance of a glass sheet or fascia is limited by defects in the glass, including both surface and internal defects. When a glass fascia is impacted, the impact point is put into compression, while a ring or "hoop" around the impact point, as well as the opposite face of the impacted sheet, is put into tension. Typically, the origin of failure will be at a flaw, usually on the glass surface, at the point of highest tension. This may occur on the opposite face, but can occur within the ring. If the flaw extends below the depth of the compressive layer, the glass will typically break. Thus, a high depth of layer is preferable.

Due to chemical strengthening, one or both of the surfaces of the glass fascias disclosed herein are under compression. In order for flaws to propagate and failure to occur, the tensile stress from an impact must exceed the surface compressive stress. In embodiments, the high compressive stress and high depth of layer of chemically-strengthened glass sheets enable the use of thinner glass than in the case of non-chemically-strengthened glass.

In the case of chemically-strengthened glass fascias, the fascia structure can deflect in response to the mechanical impact much further than thicker monolithic, non-chemically-strengthened glass or thicker, non-chemically-strengthened glass fascias. This added deflection enables more energy transfer to the fascia interlayer, which can reduce the energy that reaches the opposite side of the glass. Consequently, the chemically-strengthened glass fascias disclosed herein can withstand higher impact energies than monolithic, non-chemically-strengthened glass or non-chemically-strengthened glass fascias of similar thickness.

The impact resistance such thin chemically strengthened glass as described herein was evaluated using a suite of ball drop tests and spring hammer impact tests. The impact tests included (a) a 1.6, or 2.0 or 2.5 ft.-lbs ball-drop test with a 540 g (1.18 lb) ball, and/or (b) a 0.5 Joule Spring hammer impact tests at 3 blows for each point. The tested samples had a 100% survival rate, as set forth by the UL858, UL2157 and/or IEC60068-2-75 standards.

Thin chemically strengthened glass sheets as described herein may sized and used as cover glass for covering display or control panels on devices such as refrigerators, freezers, dishwashers, ovens and ranges. In embodiments hereof, glass sheets to be used as a cover glass for a control panes/user interface only (e.g. not to be used as a full front fascia as previously described herein) and may have a length and width that independently vary from a few centimeters to about 50 cm. In other embodiments, the glass sheets may be used as partial or full fascias on the front of a device such as an appliance and may have a length and width that independently vary from 10 cm to several meters (e.g., 0.1, 0.2, 0.5, 1, 2, or 3 m).

Among other things, this disclosure provides a solution for producing a Gorilla glass based and lighter weight fascia or front panel for devices such as household appliance, as well as a solution for mounting this panel onto the appliance front in a quick releasable manner.

Embodiments described herein include a glass fascia for a device comprising: a chemically-strengthened glass sheet having a thickness less than 2.0 mm and a near-surface region under a compressive stress, wherein the compressive stress (CS) at a surface of the first glass sheet may be greater than 300 MPa, and the near surface region extends from a surface of the first glass sheet to a depth of layer (in micrometers) of at least 65-0.06 (CS). The compressive stress (CS) at a surface of the first glass sheet may also be one of greater than 400 MPa, or greater than 600 MPa. The compressive stress (CS) at a surface of the first glass sheet may also be greater than 600 MPa and the depth of layer is at least 20 micrometers.

The glass sheet forming the fascia may include at least 6 wt. % aluminum oxide. The composition of the glass sheet may alternatively include one or more alkaline earth oxides, such that a content of alkaline earth oxides is at least 5 wt. %.

The glass fascia may have at least one linear dimension greater than 0.1 m. The glass fascia may have an area greater than 1 m².

The glass fascia may have a curvature.

The glass fascia may have a substantially planar central portion having opposing substantially planar side portions that are bent rearward from central portion. The glass may also have edge portions that are bent inwardly from the side portions.

An inner surface of the central portion of the glass fascia may be adhered to mounting rails attached to a front surface of a device. The mounting rails may be releasably mounted to the device providing for removal from and attachment of the glass fascia to the device. There may be at least two mounting rails, with a mounting rail located adjacent the side edges of the central portion of the glass fascia, such that a space is provided between the inner surface of the central portion of the glass fascia and the front surface of the device. A backer sheet may be located in the space that has a width that substantially spans a distance between the mounting rails in order to support the glass fascia between the mounting rails. The backer sheet may be formed of a material having a modulus of 2 GPa or more.

The backer sheet may be adhered to one of the front surface of the device or the inner surface of the central portion of the glass fascia.

At least one discrete portion of the backer sheet may be adhered to one of the front surface of the device or the inner surface of the central portion of the glass fascia. Four discrete portions of the backer sheet adjacent to the corners of the backer sheet may be adhered to one of the front surface of the device or the inner surface of the central portion of the glass fascia. Alternatively, a discrete central portion of the backer sheet may be adhered to one of the front surface of the device or the inner surface of the central portion of the glass fascia.

The front surface of the device may be non-planar, and there may be seats adjacent to the mounting rails for supporting the outer edges of the backer sheet. The seat may be formed by an extension of the mounting rail.

There may be at least two mounting rails, with a mounting rail located adjacent the side edges of the central portion of the glass fascia; and the side portions of the glass fascia extend rearward from the central portion of the glass fascia a distance sufficient to cover the mounting rails. The side portions of the glass fascia may also extend rear rearward from the central portion of the glass fascia a distance sufficient to cover the mounting rails and at least a portion of the sides of the device with a seamless decorative glass fascia.

The device may be a household appliance having a door, the glass fascia may be mounted on a front surface of the door, and the side portions of the glass fascia may extend rear rearward from the central portion of the glass fascia a distance sufficient to cover the mounting rails and at least a portion of sides of the door. The central portion of the glass fascia may seamlessly covers a portion of the front surface of the door. The central portion of the glass fascia may seamlessly covers substantially the entire front surface of the door.

At least one of a display panel or control panel may be located in a space between the inner surface of the central portion of the glass fascia and the front surface of the device for at least one of viewing or activating the panel through the glass fascia. In the case of the previously described glass clad stainless steel device or appliance, a display panel may be located in a recess or opening formed or cut in the stainless steel.

The device maybe a refrigerator having a door and the glass fascia may be mounted on a front of the door.

There may be at least two mounting rails, with a mounting rail located adjacent the side edges of the central portion of the glass fascia, such that a space is provided between the inner surface of the central portion of the glass fascia and the front surface of the device. At least one of a display panel or control panel may be located in the space between the inner surface of the central portion of the glass fascia and the front surface of the device for at least one of viewing or activating the panel through the glass fascia.

The glass fascia may have a thickness of about 1 mm or less or about 0.7 mm or less.

As used herein, the singular forms "a," "an," and "the" include plural referents unless the context clearly dictates otherwise. Thus, for example, reference to a "metal" includes examples having two or more such "metals" unless the context clearly indicates otherwise.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It is also noted that recitations herein refer to a component of the present invention being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

It will be apparent to those skilled in the art that various modifications and variations can be made to the present invention without departing from the spirit and scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An appliance with a thin glass fascia mounted on an outer surface of the appliance, the thin glass fascia comprising:
    a chemically-strengthened glass sheet having a thickness less than 2.0 m and a near-surface region under a compressive stress, wherein the compressive stress (CS) at a surface of the glass sheet is greater than about 300 MPa and extends to a depth of layer of at least 20 µm; and
    a backer sheet adhered to one or more portions of the glass sheet, the backer sheet having a modulus of elasticity of at least about 2 GPa and comprising a material chosen from polycarbonate, acrylonitrile butadiene styrene (ABS), acrylic, nylon, or unplasticized polyvinyl chloride (PVC),
    wherein the glass sheet further comprises a substantially planar or curved central portion having opposing side portions that are bent rearward from the central portion.

2. The appliance according to claim 1, wherein the compressive stress (CS) at a surface of the glass sheet is greater than about 400 MPa.

3. The appliance according to claim 2, wherein the compressive stress (CS) at the surface of the glass sheet is greater than about 600 MPa.

4. The appliance according to claim 1, wherein a composition of the glass sheet includes at least one of (a) 6 wt. % aluminum oxide; and (b) one or more alkaline earth oxides, such that a content of alkaline earth oxides is at least 5 wt. %.

5. The appliance according to claim 1, wherein the glass sheet has an area greater than $1\ m^2$.

6. The appliance according to claim 1, wherein an inner surface of the central portion of the glass sheet is adhered to at least two mounting rails, with a mounting rail located adjacent each side edge of the central portion of the glass sheet, such that a space is provided between the inner surface of the central portion of the glass sheet and the outer surface of the appliance; and
    wherein the backer sheet substantially spans a distance between the at least two mounting rails.

7. The appliance according to claim 1, wherein the backer sheet extends beyond at least the side edges of the glass sheet to protect the edges of the glass sheet from impacts.

8. The appliance according to claim 7, wherein an inner surface backer sheet is adhered to at least two mounting rails, with a mounting rail located adjacent each side edge of the central portion of the glass sheet, such that a space is provided between the inner surface of the backer sheet and the outer surface of the appliance.

9. The appliance according to claim 6, wherein the side portions of the glass sheet extend rearward from the central portion of the glass sheet a distance sufficient to conceal the mounting rails.

10. The appliance according to claim 9, where the side portions of the glass sheet extend rearward from the central portion of the glass sheet a distance sufficient to conceal the mounting rails and at least a portion of sides of the appliance with a seamless decorative glass sheet.

11. The appliance according to claim 10, wherein the appliance has one of a door and a lid, the glass sheet is mounted on an outer surface of the one of a door and a lid, and the side portions of the glass sheet extend rearward from the central portion of the glass sheet a distance sufficient to cover the mounting rails and at least a portion of sides of the door.

12. The appliance according to claim 11, wherein the glass sheet seamlessly covers substantially the entire outer surface of the door or lid.

13. The appliance according to claim 1, further comprising at least one of a display panel or control panel located in the space between an inner surface of the glass sheet and the outer surface of the appliance for at least one of viewing or activating the panel through the glass sheet.

14. The appliance according to claim 1, wherein the glass sheet has a thickness of about 1 mm or less.

15. The appliance according to claim 1, wherein the glass sheet has a thickness of about 0.7 mm or less.

16. The appliance according to claim 15, wherein a bend in the glass fascia has a radius of curvature of 10 mm or less.

17. The appliance according to claim 15, wherein a bend in the glass sheet has a radius of curvature of 5 mm or less.

18. The appliance according to claim 1, wherein compressive stress (CS) (in MPa) in the near surface region of the glass sheet extends from a surface of the first glass sheet to a depth of layer (in µm) of at least 65-0.06(CS) on a plot of depth of layer on the x-axis and CS on the y-axis.

19. An appliance with a thin glass sheet on an outer surface of the appliance; the appliance comprising:
    a glass sheet having a thickness less than 2.0 mm;
    mounting elements mounting the glass sheet to an outer surface of the appliance with a space between an inner surface of the glass sheet and an outer surface of the appliance;
    at least one of a display panel or a control panel located in the space for at least one of viewing or activating the panel through the glass sheet; and
    a backer sheet adhered to one or more portions of the glass sheet, the backer sheet having a modulus of elasticity of at least about 2 GPa and comprising a material chosen from polycarbonate, acrylonitrile butadiene styrene (ABS), acrylic, nylon, or unplasticized polyvinyl chloride (PVC),
    wherein the glass sheet further comprises a substantially planar or curved central portion having opposing side portions that are bent rearward from the central portion.

20. The appliance according to claim 19, wherein the appliance is one of a kitchen appliance and a laundry appliance having one of a door and a lid, and the glass sheet is mounted on the one of a door and a lid.

21. The appliance according to claim 19, wherein the glass sheet is a chemically-strengthened glass sheet having a near-surface region under a compressive stress (CS), wherein the CS at a surface of the first glass sheet is greater than 300 MPa.

22. The appliance according to claim 21, wherein the CS wherein the CS in the near surface region extends from a surface of the glass sheet to a depth of layer of at least 20 µm.

23. The appliance according to claim 19, wherein the glass sheet is chemically-strengthened and has a near-surface region under a compressive stress (CS) (in MPa), wherein the CS in the near surface region extends from a surface of the first glass sheet to a depth of layer (in µm) of at least 65-0.06 (CS).

24. The appliance according to claim 23, wherein the CS at the near-surface region of the glass sheet is greater than 300 MPa.

25. An appliance with a laminate structure on an outer surface of the appliance, the appliance comprising:
    a laminate structure having:
    a first glass sheet having a thickness less than 2.0 mm, and
    a polymer interlayer formed over a major surface of the first glass sheet;
    mounting elements mounting the laminate structure to an outer surface of the appliance with a space between an inner surface of the laminate structure and an outer surface of the appliance;
    a backer sheet adhered to one or more portions of the laminate structure, the backer sheet having a modulus of elasticity of at least about 2 GPa and comprising a material chosen from polycarbonate, acrylonitrile butadiene styrene (ABS), acrylic, nylon, or unplasticized polyvinyl chloride (PVC); and at least one of a display panel or a control panel located in the space for at least one of viewing or activating the panel through the laminate structure, wherein the laminate structure further comprises a substantially planar or curved central portion having opposing side portions that are bent rearward from the central portion.

26. The appliance of claim 25, wherein the laminate structure further comprises a second glass sheet having a thickness less than 2.0 mm, and wherein the polymer interlayer is positioned intermediate the first and second glass sheets.

27. The appliance of claim 25, wherein the polymer interlayer is selected from the group consisting of a monolithic polymer sheet, a multilayer polymer sheet, a composite polymer sheet, a plasticized polyvinyl butyral (PVB) sheet, a polycarbonate sheet, PVB, and combinations thereof.

28. The appliance of claim 25, wherein the appliance is a one of a kitchen appliance and a laundry appliance having one of a door and a lid, and the laminate structure is mounted on the one of a door and a lid.

29. The appliance of claim 25, wherein the first glass sheet is a chemically-strengthened glass sheet having a near-surface region under a compressive stress (CS), and wherein the CS at a surface of the first glass sheet is greater than 300MPa.

30. The appliance of claim 29, wherein the CS in the near surface region extends from a surface of the first glass sheet to a depth of layer of at least 20 μm.

31. The appliance of claim 25, wherein the first glass sheet is chemically-strengthened and has a near-surface region under a compressive stress (CS) (in MPa), wherein the CS in the near surface region extends from a surface of the first glass sheet to a depth of layer of at least 65-0.06(CS).

32. The appliance of claim 31, wherein the CS at a surface of the first glass sheet is greater than 300 MPa.

33. The appliance of claim 25, wherein the first glass sheet has a thickness of about 1 mm or less.

34. The appliance of claim 25, wherein the first glass sheet has a thickness of about 0.7 mm or less.

* * * * *